(12) United States Patent
Sugiyama et al.

(10) Patent No.: US 6,765,206 B2
(45) Date of Patent: *Jul. 20, 2004

(54) IMAGE READING APPARATUS

(75) Inventors: Miho Sugiyama, Kawasaki (JP); Hiroyuki Wada, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/569,256

(22) Filed: May 11, 2000

(65) Prior Publication Data

US 2003/0132384 A1 Jul. 17, 2003

(30) Foreign Application Priority Data

May 12, 1999 (JP) ............................................. 11-131561
Jan. 25, 2000 (JP) ........................................ 2000-016053

(51) Int. Cl.⁷ ............................. B01D 59/44; H04N 1/40
(52) U.S. Cl. ............... 250/330; 250/341.1; 250/339.05; 250/341.5; 358/448; 358/474
(58) Field of Search .............................. 250/341.1, 330, 250/339.05, 341.5; 358/448, 474, 500, 501, 106; 382/135, 140, 162

(56) References Cited

U.S. PATENT DOCUMENTS

| 4,933,983 A | * | 6/1990 | Hiramatsu et al. | .......... 358/106 |
| 5,036,405 A | * | 7/1991 | Kojima | ........................ 358/448 |
| 5,515,181 A | * | 5/1996 | Iyoda et al. | ................. 358/474 |
| 6,226,421 B1 | * | 5/2001 | Monji | ........................ 382/300 |
| 6,339,219 B1 | * | 1/2002 | Ishizuya et al. | ............. 250/330 |
| 2002/0071141 A1 | * | 6/2002 | Katakura et al. | ........... 358/474 |
| 2002/0131648 A1 | * | 9/2002 | Hayashide | .................. 382/275 |

FOREIGN PATENT DOCUMENTS

EP          1 547 811      *  6/1979

* cited by examiner

Primary Examiner—Georgia Epps
Assistant Examiner—M. Hasan
(74) Attorney, Agent, or Firm—Morgan & Finnegan, LLP

(57) ABSTRACT

An image reading method for forming an image on a transmission original irradiated with visible light and infrared light by an image forming optical system and reading the image by reading means, comprising an image forming magnification correction step of correcting a difference between the image forming magnification of a visible-light image and the image forming magnification of an infrared-light image by the image forming optical system, so that the image reading apparatus can be miniaturized and simplified and defects such as foreign matters and flaws on the original can adequately be corrected.

87 Claims, 30 Drawing Sheets

(a)-1     (a)-2     18a (c)-1     (c)-2

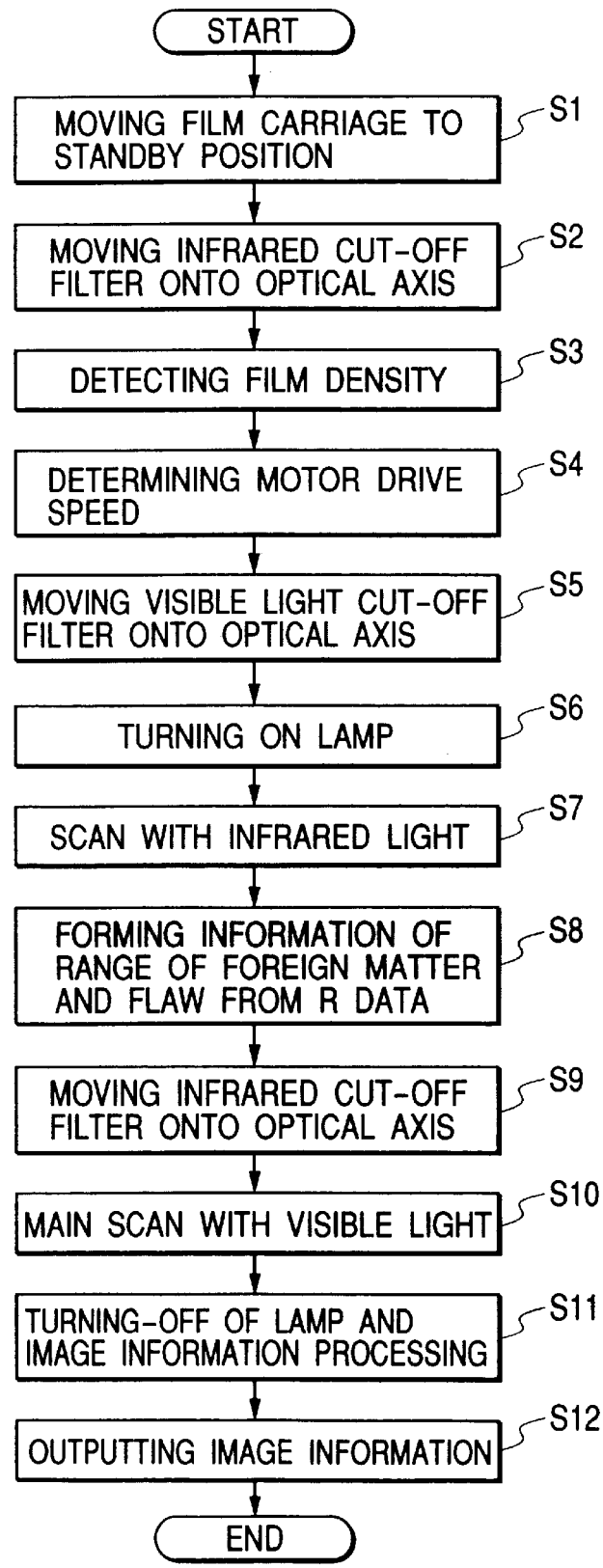

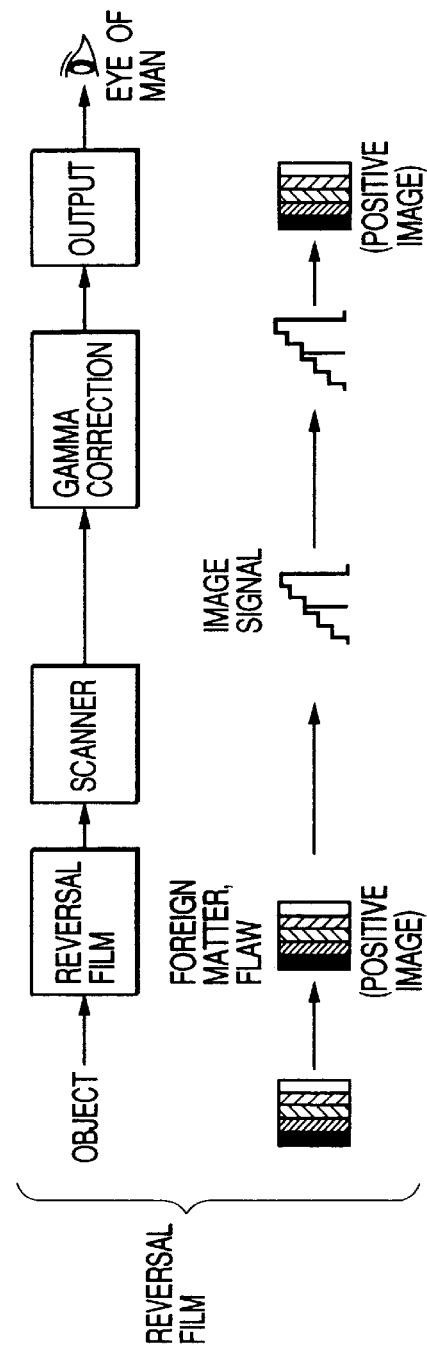
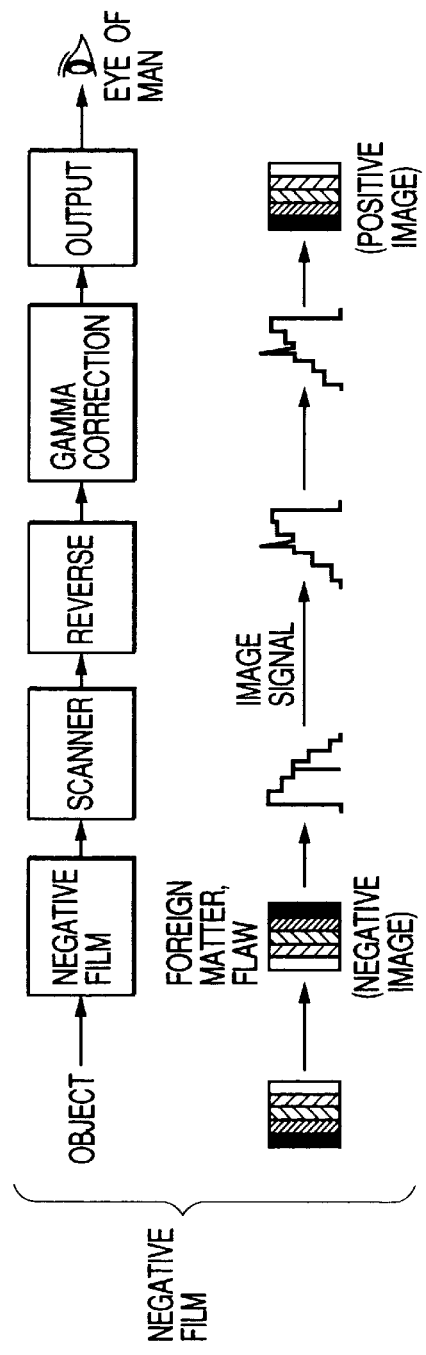

IMAGE READING APPARATUS

BACKGROUND OF THE INVENTION

1. Field of the Invention

The present invention relates to an image reading method for reading the image of transmission originals such as a developed photograph film, an image reading apparatus thereof, and a memory medium for storing a control program to control the image reading apparatus.

2. Related Background Art

In a conventional image reading apparatus (film scanner), transmission originals such as a micro film and a photograph film is irradiated by a lighting optical system from the back of the transmission originals and the transmitted light is projected to the image forming plane of a photoelectric conversion element via a projection optical system to form an image, thereby performing photoelectric conversion by the photoelectric conversion element to convert information of the transmission original into electrically.

In such the conventional apparatus, however, foreign matters adhering to the lighting optical system and projection optical system and foreign matters and flaws on the transmission original appear as black spots on the read image data, and as a result there arises a problem that the image is deteriorated.

FIGS. 34A and 34B are schematic diagrams showing the influence of the above-described foreign matters and flaws to the image data and output image, FIG. 34A shows that the transmission original is a reversal film, and FIG. 34B shows that the transmission original is a negative film.

In FIG. 34A, the image (positive image) of the reversal film on which an object is photographed is read by a scanner (film scanner) as an image reading apparatus, and the read image signal is subjected to gamma correction, and outputted as the positive image visible to human eyes.

Moreover, in FIG. 34B, the image (negative image) of the negative film on which the object is photographed is read by the scanner (film scanner) as the image reading apparatus, the read image signal is subjected to reversal processing, and subsequently to the gamma correction (image processing), and is outputted as the positive image visible to human eyes.

As shown in FIGS. 34A and 34B, whichever the transmission original is the reversal film or the negative film, the foreign matters/flaws appear as the black spots on the image signal and output image (positive image), when the transmission original is converted to the image signal and read by the scanner (film scanner) as the image reading apparatus.

As a result, for the reversal film, as shown in FIG. 34A, since the image signal is subjected to the image processing such as the gamma correction and outputted onto an output apparatus such as a printer as it is, the influences of the foreign matters/flaws appear as the black spots on the output image (positive image) as they are.

On the other hand, for the negative film, as shown in FIG. 34B, since the image signal read by the scanner is subtracted from the image signal read at a full level to convert the negative image to the positive image, the influences of the foreign matters/flaws appear as white luminous spots on the output image (positive image).

To solve the problem, the transmittance characteristic of the transmission original to infrared light has been noted, and there has already been proposed an image reading apparatus (film scanner) for detecting only the foreign matters/flaws causing the image deterioration as described above, by the infrared light transmitted through the transmission original, and applying the correction to the read image data with the information of the detected foreign matters/flaws.

FIG. 35A shows a visible image reading system, and FIG. 35B shows an infrared image reading system. Moreover, in the drawings, numeral 31 denotes an original, 32 denotes an image plane as a light receiving element such as CCD, and 33 denotes an image forming lens for forming the image of the original 31 on the image plane 32.

In FIG. 35A, in order to read the image of the original 31, the image of the original 31 irradiated with visible light is read in an appropriate image forming state. On the other hand, in FIG. 35B, the infrared light is radiated to the image of the original 31 to read the defects such as the foreign matters and flaws on the original.

In this manner, the defects in the image information read by the visible light are corrected by the range information of the foreign matters and flaws on the original read by the infrared light.

One example is disclosed in Japanese Patent Publication No. 7-97402 (hereinafter referred to as a first related art), Japanese Patent No. 2559970 (hereinafter referred to as a second related art) and Japanese Patent Publication No. 6-78992 (hereinafter referred to as a third related art).

In the first related art, the image information around the pixel recognized as the foreign matter/flaw is appropriately selected to perform data correction.

Moreover, in the second related art, in addition to the image correction from the image data around the pixel recognized as the foreign matter/flaw, the image correction is also performed based on the infrared-light data of the area of the pixels recognized as the foreign matters/flaws, and further a plurality of image correction methods are adaptively used in accordance with the level of the infrared-light data.

Furthermore, in the third related art, in order to correct the positional deviation of the image forming plane by the wavelength difference between the visible light and the infrared light, the optical path length can be changed for each light to be formed into the image.

However, in the related art, when the optical path length is changed to correct the positional deviation of the image forming plane, a relative ratio of a distance between a transmission original surface and an optical system main point position to a distance between the optical system main point position and the image forming plane changes, then the visible light is different from the infrared light in image magnification, and it is disadvantageously difficult to accurately grasp the position of the foreign matter/flaw. Thus, the correction of the foreign matter/flaw is incorrect, and the image grade is sometimes deteriorated by performing the correction processing.

Moreover, in the related art described above, when the foreign matter/flaw area is grasped by the infrared light, and if the image data is extracted with the same resolution as that of the scan by the visible light, the time or memory required for extracting the image data is simply doubled, and further the time required for correcting the image data or the memory capacity is also necessary by the considerable amount, thereby causing a problem that there is a difficulty in operationality for performing the correction processing of the foreign matter/flaw.

Furthermore, in the related art described above, since the correction of the foreign matter/flaw on the transmission original is performed in the system, that is, in the system controller, an operator cannot recognize the progress. The operator simply needs to see the corrected image with respect to the image of the transmission original having the foreign matter/flaw to recognize that the correction has been performed. Moreover, since the foreign matter/flaw correction system is not universal for all cases, and conversely the image is sometimes deteriorated by performing the correction, the operator needs to recognize the progress also to judge whether or not to correct the foreign matter/flaw. In the related art, however, the operator cannot easily compare or recognize the foreign matter/flaw correction effects, and it is disadvantageously difficult to easily select an image from an image finally obtained before performing the foreign matter/flaw correction and an image after such the performing.

SUMMARY OF THE INVENTION

The present invention has been developed in consideration of the above-described problems of the related arts, and a first object thereof is to provide an image reading method and apparatus in which the position of a foreign matter/flaw can exactly be grasped.

Moreover, a second object of the present invention is to provide an image reading method and apparatus in which foreign matter/flaw correction can exactly be performed without complicating a circuit constitution or without increasing the necessary memory capacity and processing time.

Furthermore, a third object of the present invention is to provide an image reading method and apparatus in which an operator can easily compare and recognize the effects of the foreign matter/flaw correction, and can easily select an image from an image finally obtained before performing the foreign matter/flaw correction and an image obtained after such the performing.

Additionally, a fourth object of the present invention is to provide a memory medium for storing a control program to control the image reading apparatus of the present invention.

To attain the first object, according to the present invention, there is provided an image reading method of forming an image on a transmission original illuminated with visible light and infrared light by an image forming optical system and reading the image by reading means, comprising an image forming magnification correction step of correcting a difference between an image forming magnification of a visible-light image and the image forming magnification of an infrared-light image of the image forming optical system.

Moreover, to attain the first object, according to the present invention, there is also provided an image reading apparatus for forming an image on a transmission original illuminated with visible light and infrared light by an image forming optical system and reading the image by reading means, comprising image forming magnification correction means for correcting a difference between an image forming magnification of a visible-light image and the image forming magnification of an infrared-light image of the image forming optical system.

Furthermore, to attain the second object, according to the present invention, there is provided a memory medium which stores a control program to control an image reading apparatus for forming an image on a transmission original irradiated with visible light and infrared light by an image forming optical system and reading the image by reading means and which is readable by information reading means, the control program comprising an image forming magnification correction module for correcting a difference between an image forming magnification of a visible-light image and the image forming magnification of an infrared-light image of the image forming optical system.

Additionally, to attain the first object, according to the present invention, there is provided an image reading method for irradiating a transmission original with visible light and infrared light and reading an image on the transmission original by reading means, comprising: an infrared-light image extraction step of focusing by a visible-light image and subsequently changing an optical path length to extract an infrared-light image; and an area determination step of correcting an image magnification change caused during the extraction of the infrared-light image and determining a correction requiring area.

Moreover, to attain the first object, according to the present invention, there is provided an image reading apparatus for irradiating a transmission original with visible light and infrared light and reading an image on the transmission original by reading means, comprising: infrared-light image extraction means for focusing by a visible-light image and subsequently changing an optical path length to extract an infrared-light image; and area determination means for correcting an image magnification change caused during the extraction of the infrared-light image and determining a correction requiring area.

Furthermore, to attain the first object, according to the present invention, there is provided an image reading method comprising: a light emission step of emitting visible light and infrared light to illuminate a transmission original; an image forming step of forming light transmitted through the transmission original into an image by an optical system; an optical path length change step of changing the optical path length of an optical system for forming the light transmitted through the transmission original into an image; a focusing step of using the optical path length change step to perform a focusing operation; alight detection step of detecting the light transmitted through the optical system; a storing step of storing a light detection result in the light detection step; a calculation step of comparing and calculating contents stored in the storing step; a judging step of judging from the light detection result in the light detection step whether an area requires correction or not; and a correcting step of correcting image data in the correction requiring area, wherein when the transmission original is illuminated with the visible light, a focused state is obtained by the focusing step, and when the transmission original is illuminated with the infrared light, the optical path length is changed only by a predetermined amount predetermined in the optical length change step, from the focused state.

Additionally, to attain the first object, according to the present invention, there is provided an image reading apparatus comprising: light emission means for emitting visible light and infrared light to illuminate a transmission original; an optical system for forming the light transmitted through the transmission original into an image; optical path length change means for changing the optical path length of the optical system; focusing means for using the optical path length change means to perform a focusing operation; light detection means for detecting the light transmitted through the optical system; storing means for storing a light detection result by the light detection means; calculation means for comparing and calculating contents stored by the storing means; judgment means for judging from the light detection result by the light detection means whether an area requires correction or not; and correction means for correcting image data in the correction area, wherein when the transmission original is illuminated with the visible light, a focused state is obtained by the focusing means, and when the transmission original is illuminated with the infrared light, the optical path length is changed only by a predetermined amount predetermined by the optical length change means, from the focused state.

Moreover, to attain the second object, according to the present invention, there is provided an image reading method of irradiating a transmission original with visible light and infrared light and reading a transmission original image by reading means, comprising a reading resolution setting step of allowing a reading resolution by the visible light to differ from the reading resolution by the infrared light.

Furthermore, to attain the second object, according to the present invention, there is provided an image reading apparatus for irradiating a transmission original with visible light and infrared light and reading a transmission original image by reading means, comprising reading resolution setting means for allowing a reading resolution by the visible light to differ from the reading resolution by the infrared light.

Additionally, to attain the second object, according to the present invention, there is provided an image reading method comprising: a light emission step of emitting visible light and infrared light to irradiate a transmission original; a light detection step of detecting the light transmitted through the transmission original; a storing step of storing a light detection result in the light detection step; a calculation step of comparing and calculating contents stored in the storing step; a judgment step of judging from the light detection result by the light detection step whether an area requires correction or not; a correction step of correcting image data in the correction requiring area; and a reading resolution setting step of allowing a reading resolution by the visible light to differ from the reading resolution by the infrared light.

Moreover, to attain the second object, according to the present invention, there is provided an image, reading apparatus comprising: light emission means for emitting visible light and infrared light to irradiate a transmission original; light detection means for detecting the light transmitted through the transmission original; storing means for storing a light detection result by the light detection means; calculation means for comparing and calculating contents stored by the storing means; judgment means for judging from the light detection result by the light detection means whether an area requires correction or not; correction means for correcting image data in the correction requiring area; and reading resolution setting means for allowing a reading resolution by the visible light to differ from the reading resolution by the infrared light.

Furthermore, to attain the third object, according to the present invention, there is provided an image reading method of irradiating a transmission original with visible light and infrared light, reading a transmission original image by reading means, detecting an area of a correction object from image data by the infrared light, and correcting the detected correction object, comprising a display step of displaying images obtained before and after the correction.

Additionally, to attain the third object, according to the present invention, there is provided an image reading apparatus for irradiating a transmission original with visible light and infrared light, reading a transmission original image by reading means, detecting an area of a correction object from image data by the infrared light, and correcting the detected correction object, comprising display means for displaying images obtained before and after the correction.

Moreover, to attain the third object, according to the present invention, there is provided an image reading method comprising: a light emission step of emitting visible light and infrared light to illuminate a transmission original; a light detection step of detecting the light transmitted through the transmission original; a storing step of storing a light detection result in the light detection step; a calculation step of comparing and calculating contents stored by the storing step; a judgment step of judging from the light detection result by the light detection step whether an area requires correction or not; a correction step of correcting image data in the correction requiring area; and a display step of displaying a first image obtained before the correction is performed by the correction step and a second image obtained after the correction is performed by the correction step.

Furthermore, to attain the third object, according to the present invention, there is provided an image reading apparatus comprising: light emission means for emitting visible light and infrared light to irradiate a transmission original; an optical system for forming the light transmitted through the transmission original into an image; light detection means for detecting the light transmitted through the optical system; storing means for storing a light detection result by the light detection means; calculation means for comparing and calculating contents stored by the storing means; judgment means for judging from the light detection result by the light detection means whether an area requires correction or not; correction means for correcting image data in the correction requiring area; and display means for displaying a first image obtained before the correction is performed by the correction means and a second image obtained after the correction is performed by the correction means.

Additionally, to attain the fourth object, according to the present invention, there is provided a memory medium which stores a control program to control an image reading apparatus for illuminating a transmission original with visible light and infrared light and reading an image on the transmission original by reading means and which is readable by information reading means, the control program comprising: an infrared-light image extraction module for focusing by a visible-light image and subsequently changing an optical path length to extract an infrared-light image; and an area determination module for correcting an image magnification change caused during the extraction of the infrared-light image and determining a correction requiring area.

Moreover, to attain the fourth object, according to the present invention, there is provided a memory medium which stores a control program to control an image reading apparatus for irradiating a transmission original with visible light and infrared light and reading an image on the transmission original by reading means and which is readable by information reading means, the control program comprising: a light emission module for emitting the visible light and the infrared light to illuminate the transmission original; an optical path length change module for changing an optical path length of an optical system for forming the light transmitted through the transmission original into an image; a focusing module for using the optical path length change module to perform a focusing operation; a light detection module for detecting the light transmitted through the optical system; a storing module for storing a light detection result by the light detection module; a calculation module for comparing and calculating contents stored by the storing module; a judgment module for judging from the light detection result by the light detection module whether an area requires correction or not; and a correction module for correcting image data in the correction requiring area, wherein when the transmission original is illuminated with the visible light, a focused state is obtained by the focusing module, and when the transmission original is illuminated with the infrared light, the optical path length is changed only by a predetermined amount predetermined by the optical path length change module, from the focused state.

Furthermore, to attain the fourth object, according to the present invention, there is provided a memory medium which stores a control program to control an image reading apparatus for illuminating a transmission original with visible light and infrared light and reading an image on the transmission original by reading means and which is readable by information reading means, the control program comprising a reading resolution setting,module for allowing a reading resolution by the visible light to differ from the reading resolution by the infrared light.

Additionally, to attain the fourth object, according to the present invention, there is provided a memory medium which stores a control program to control an image reading apparatus for illuminating a transmission original with visible light and infrared light and reading an image on the transmission original by reading means and which is readable by information reading means, the control program comprising: a light emission module for emitting the visible light and the infrared light to illuminate the transmission original; a light detection module for detecting the light transmitted through an optical system for forming the light transmitted through the transmission original into an image; a storing module for storing a light detection result by the light detection module; a calculation module for comparing and calculating contents stored by the storing module; a judgment module for judging from the light detection result by the light detection module whether an area requires correction or not; a correction module for correcting image data in the correction requiring area; and a reading resolution setting module for allowing a reading resolution by the visible light to differ from the reading resolution by the infrared light.

A fifth object of the present invention is to provide an image reading apparatus which miniaturizes and simplifies the apparatus and which can adequately correct defects such as foreign matters and flaws on an original.

To attain the above-described object, according to the present invention, there is provided an image reading apparatus comprising a visible-light filter for forming a visible-light original image; an infrared-light filter for forming an infrared-light original image; and correction means for correcting a defect of the visible-light original image based on the infrared-light original image, wherein thickness values of the visible-light filter and the infrared-light filter are set so that an original image forming error caused by a difference in wavelength between visible light and infrared light is corrected.

Moreover, there is provided another image reading apparatus comprises: a visible-light filter for forming a visible-light original image; an infrared-light filter for forming an infrared-light original image; signal processing means for correcting an original image magnification error caused by a difference in wavelength between visible light and infrared light; and correction means for correcting a defect of the visible-light original image based on the infrared-light original image.

Furthermore, there is provided another image reading apparatus comprises: a visible-light filter for forming a visible-light original image; an infrared-light filter for forming an infrared-light original image; and correction means for correcting a defect of the visible-light original image based on the infrared-light original image, wherein thickness values of the visible-light filter and the infrared-light filter are set so that an original image magnification error caused by a difference in wavelength between visible light and infrared light is corrected.

Additionally, there is provided still another image reading apparatus comprises: a visible-light filter for forming a visible-light original image; an infrared-light filter for forming an infrared-light original image; and correction means for correcting a defect of the visible-light original image based on the infrared-light original image, wherein thickness values of the visible-light filter and the infrared-light filter are set so that an original image forming error and magnification error caused by a difference in wavelength between visible light and infrared light are corrected.

Moreover, there is provided still further image reading apparatus comprises: a visible-light filter for forming a visible-light original image; an infrared-light filter for forming an infrared-light original image; an original image forming lens which moves to correct at least one of an original image forming error and a magnification error caused by a difference in wavelength between visible light and infrared light; and correction means for correcting a defect of,the visible-light original image based on the infrared-light original image.

Other objects and characteristics of the present invention will be apparent from the following detailed description of embodiments taken in conjunction with the accompanying drawings.

BRIEF DESCRIPTION OF THE DRAWINGS

FIG. 31 is a flowchart showing the operation of the film scanner.

FIGS. 34A and 34B are schematic views showing the influence of the foreign matter/flaw in a conventional image reading apparatus.

DETAILED DESCRIPTION OF THE PREFERRED EMBODIMENTS

Embodiments of the present invention will be described hereinafter with reference to FIGS. 1 to 18.

A first embodiment of the present invention will first be described with reference to FIGS. 1 to 8.

Figure 1:
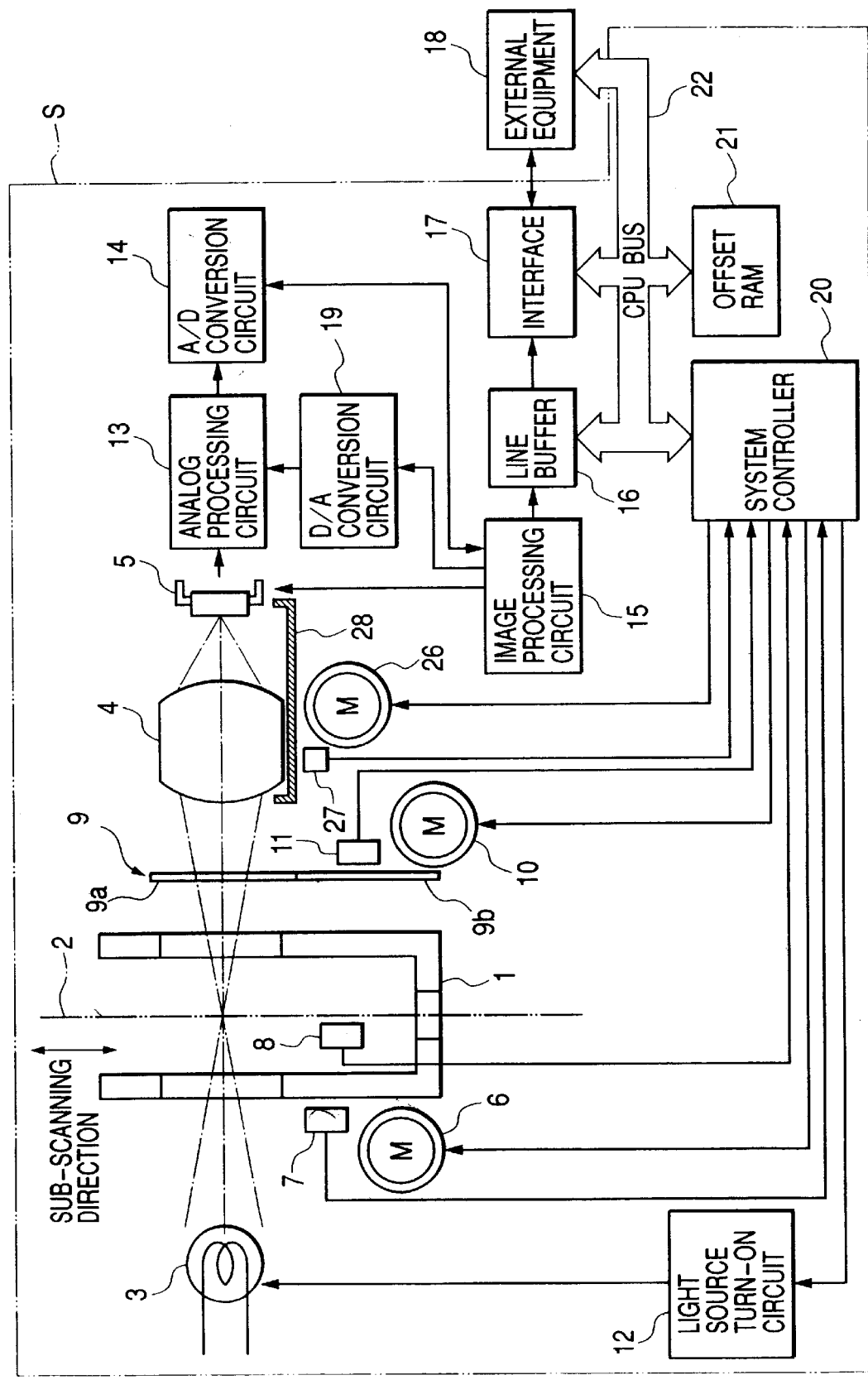
FIG. 1 is a block diagram showing a system constitution provided with an image reading apparatus according to a first embodiment of the present invention.
Figure 2:
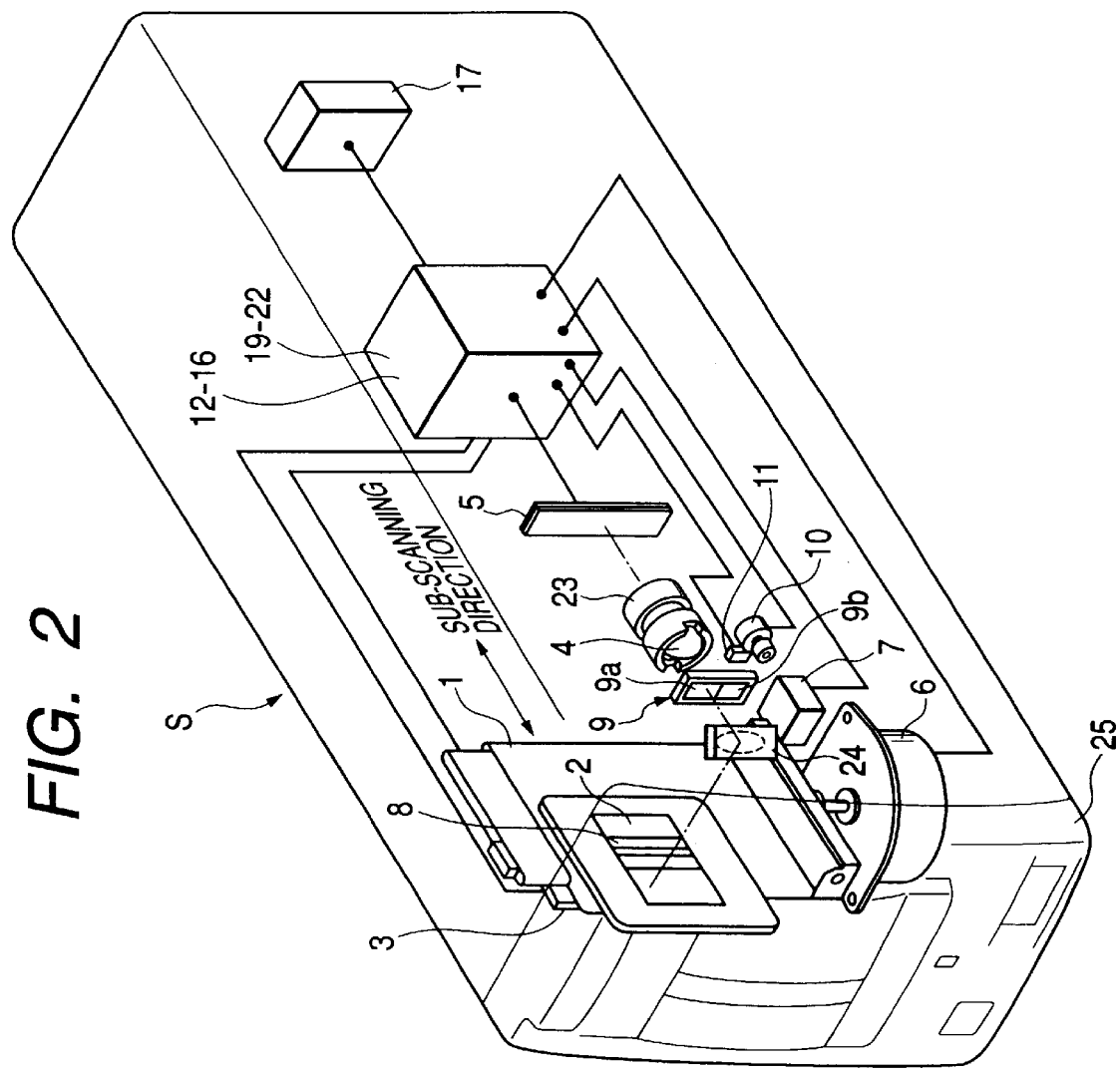
FIG. 2 is a through-view perspective view showing the internal constitution of the image reading apparatus according to the first embodiment of the present invention.

FIG. 1 is a block diagram showing the system constitution provided with an image reading apparatus of the present embodiment, and FIG. 2 is a through-view perspective view showing the internal constitution of the image reading apparatus of the present embodiment. In the drawings, S denotes an image reading apparatus (film scanner) of the present embodiment, and 1 denotes a carriage for holding a transmission original holder (transmission original adapter), and the like. Numeral 2 denotes transmission originals such as a film, and 3 denotes a light source for irradiating the transmission original 2. Numeral 4 denotes an image forming lens, 5 denotes a line sensor (image pickup element), and 6 denotes a sub-scanning motor (M) for driving the carriage 1 in a sub-scan direction. Numeral 7 denotes a carriage position detection sensor for detecting the position of the carriage 1. Numeral 8 denotes a transmission original density sensor, and 9 denotes an optical filter including an infrared-light cut-off filter 9a and a visible-light cut-off filter 9b. Numeral 10 denotes a filter motor (M) for switching the optical filter 9 to an infrared light cut state and a visible light cut state. Numeral 11 denotes a filter position detection sensor for detecting the position of the optical filter 9. Numeral 12 denotes a turn-on circuit of the light source 3, 13 denotes an analog processing circuit, 14 denotes an analog/digital (A/D) conversion circuit, 15 denotes an image processing circuit, 16 denotes a line buffer, 17 denotes an interface, 18 denotes an external equipment such as a personal computer, 19 denotes a digital/analog (D/A) conversion circuit, 20 denotes a system controller, 21 denotes an offset random access memory (RAM), and 22 denotes a central processing unit (CPU) bus.

Moreover, in FIG. 2, numeral 23 denotes a lens holder for holding the image forming lens 4. Numeral 24 denotes a mirror for bending an optical path, and 25 denotes an outer housing of the image reading apparatus S. Since the mirror 24 bends the optical path, a more compact layout can be realized, but the mirror 24 may be either present or absent, or a plurality of mirrors may be disposed. Additionally, the mirror 24 is not shown in FIG. 1.

Furthermore, in FIG. 1, numeral 26 denotes a focus motor (M), 27 denotes a focus position detection sensor, and 28 denotes a holder frame.

The operation of the present embodiment constituted as described above will next be described. In the operation, the image reading apparatus S is used to convert the image of the transmission original 2 to an electric signal, and the signal is transmitted to the external equipment 18.

The transmission original 2 is fixedly held on the carriage 1 by a transmission original holder (not shown), and the like, and connection is established by the sub-scan motor 6 via a power transmission mechanism such as a reduction machine (not shown) so that driving is possible. In the power transmission mechanism, a minimum feed pitch is appropriately set in accordance with the reading resolution of the transmission original 2.

The light source 3 is constituted of a line-shaped fluorescent tube containing inactive gas such as xenon or mercury, and is disposed substantially parallel to the main scan direction of the line sensor 5. Moreover, the light source 3 emits light of wavelengths corresponding to blue, green, red. The light source 3 as the fluorescent tube is turned on by the light source turn-on circuit 12 which is a so-called inverter circuit.

The image forming lens 4 forms the light radiated to the transmission original 2 from the light source 3 into an image on the line sensor 5. The image forming lens 4 and line sensor 5 are integrally held by the holder frame 28, and the optical axis distance between the image forming lens 4 and the line sensor 5 is adjusted in advance. Therefore, the image of the transmission original 2 is formed on the line sensor 5 at a definite magnification. Moreover, the inclination of the transmission original 2 and line sensor 5 in the main scan direction is adjusted in advance, so that the strain of an outputted image is avoided. The holder frame 28 is driven by and connected to the focus motor 26, and the position of the holder frame can be detected by the focus position detection sensor 27. By monitoring the luminance signal level of an image signal from the line sensor 5, driving the focus motor 26 to maximize the value of the luminance signal level, and correcting (changing) an optical path length, the image of the transmission original 2 can be extracted in a best focused state.

To read a high-definition image, for the image forming by the image forming lens 4, the formed image tends to be enlarged. For example, when the transmission original 2 is read at a resolution of 4000 dots/inch, the size of one pixel on the transmission original is 6.35 microns. On the other hand, the size of one pixel of the light receiving part of the line sensor 5 is usually about 8 microns. In this case, the formed image is enlarged by 1.26 times. Therefore, when the received light amount is increased by brightening F number of the image forming lens 4 in order to obtain a signal of a sufficient level against a noise generated by the line sensor or a noise jumped from the outside, a focus depth is reduced on the side of the transmission original 2. When the transmission original 2 is a developed film, flatness is occasionally deteriorated, and it is therefore preferable to drive the above-described focus mechanism and perform the operation so that the transmission original 2 is placed in the focus position.

In this case, since the image forming lens 4 has an on-axis aberration, a position where the best focused state is obtained when the transmission original 2 is illuminated with the visible light and read is in many cases different from the position of the illumination with the infrared light. In the present invention, it is preferable to set the focus mechanism in advance so that the best focused position is obtained when the transmission original is irradiated with the visible light.

Alternatively, in the image reading apparatus in which the resolution to the transmission original 2 may be low, the auto-focus mechanism is not necessarily required, and the image forming lens 4 does not need to move along the optical axis with respect to the transmission original 2. Specifically, the lens may be fixed in a position apart from the transmission original 2 only by a fixed distance in the optical axis direction. It is preferable to fix the lens at a distance at which the best focused state can be obtained during the irradiation with the visible light.

In any case, for the image reading apparatus, the resolution when the visible light is used to perform reading is preferably higher than the resolution when the infrared light is used to perform reading.

For the line sensor 5, a three-line sensor including three lines (R, G, B) is used in the present embodiment. In this three-line sensor, the respective light receiving parts are arranged in parallel at definite intervals. The image signal generated by the line sensor 5 is converted to a digital signal by the A/D conversion circuit 14, and further converted to the image data by the image processing circuit 15, the image data is added to the analog processing circuit 13 via the D/A conversion circuit 19, and a stable black level signal can be obtained.

The image processing circuit 15 is constituted of a gate array, and the like, subjects the digital image data converted by the A/D conversion circuit 14 to various processings such as a digital automatic gain control (AGC) processing, shading correction processing, γ correction processing, color data synthesis processing, resolution/magnification conversion processing, filter processing, masking processing, binarizing/automatic exposure (AE) processing, negative/positive reversal processing, and mirror image processing, and further outputs the operation clock of the line sensor 5 and sample timing signal of the A/D conversion circuit 14.

In the digital AGC processing, the dynamic range of each inputted color signal is adjusted. In the shading correction processing, correction-processed is the ununiformity in the light amount of the light source 3, the transmittance of the image forming lens 4, the sensitivity of the line sensor 5, and the like. In the γ correction processing, while an image contrast is adjusted, input gradation is converted to output gradation. In the color data synthesis processing, in order to correct the above-described position interval deviation of each light receiving part of the line sensor 5, the image data is once accumulated in the offset RAM 21, and gathered data is outputted as the color data of one line. In the resolution/magnification conversion processing, based on setting by the conversion parameter input from the system controller 20, the data is subjected to a thinning-out and adding processing. This is performed on an instruction from the external equipment 18.

In the filter processing, the processings such as a main scanning interpolation processing, sub-scanning interpolation processing, averaging processing, smoothing processing, and edge part processing are selectively performed in accordance with gradation and resolution. In the masking processing, to correct unnecessary light from the light source 3 and substantially idealize the color characteristic, the processing is performed by multiplying each color data by a correction factor. In the binarizing/AE processing, green channel data is particularly used to perform the processing on the instruction from the external equipment 18. The slice level is automatically set during detection of the density of the transmission original 2. For the negative/positive reversal processing, when the negative filter is set to the transmission original 2, the processing is performed on the instruction from the system controller 20. This is, for example, constituted by an exclusive OR circuit. For the mirror image processing, the processing is performed by reading the data written into the offset RAM 21 from the reverse on the instruction from the external equipment 18.

The offset RAM 21 is prepared as a working area in performing the above-described image processing, and temporarily stores the image data. Moreover, the line buffer 16 temporarily saves the image data subjected to the above-described processing in the image processing circuit 15, and the image data is outputted to the external equipment 18 from the interface 17 of SCSI controller or the like.

As described above, the system controller 20 is connected to the image processing circuit 15, line buffer 16, interface 17, and offset RAM 21 via the CPU bus 22 constituted by an address bus and a data bus as shown in FIG. 1. This enables the respective circuits to mutually perform data communication.

In this constitution, the user of the image reading apparatus S gives a command to the system controller 20 through the external equipment 18. The command from the user is transmitted to the system controller 20 via the interface 17. Concretely, the user command includes the type of the transmission original 2, image reading range, reading resolution, main scanning command, and whether or not to perform the foreign matter and flaw processing. By these user commands and the outputs from various detection circuits (sensors), electric preparation and processing are performed in accordance with the flow appropriately programmed by the system controller 20.

The operation of converting the image of the transmission original 2 to an electric signal will next be described with reference to FIGS. 3 to 6.

Figure 3:
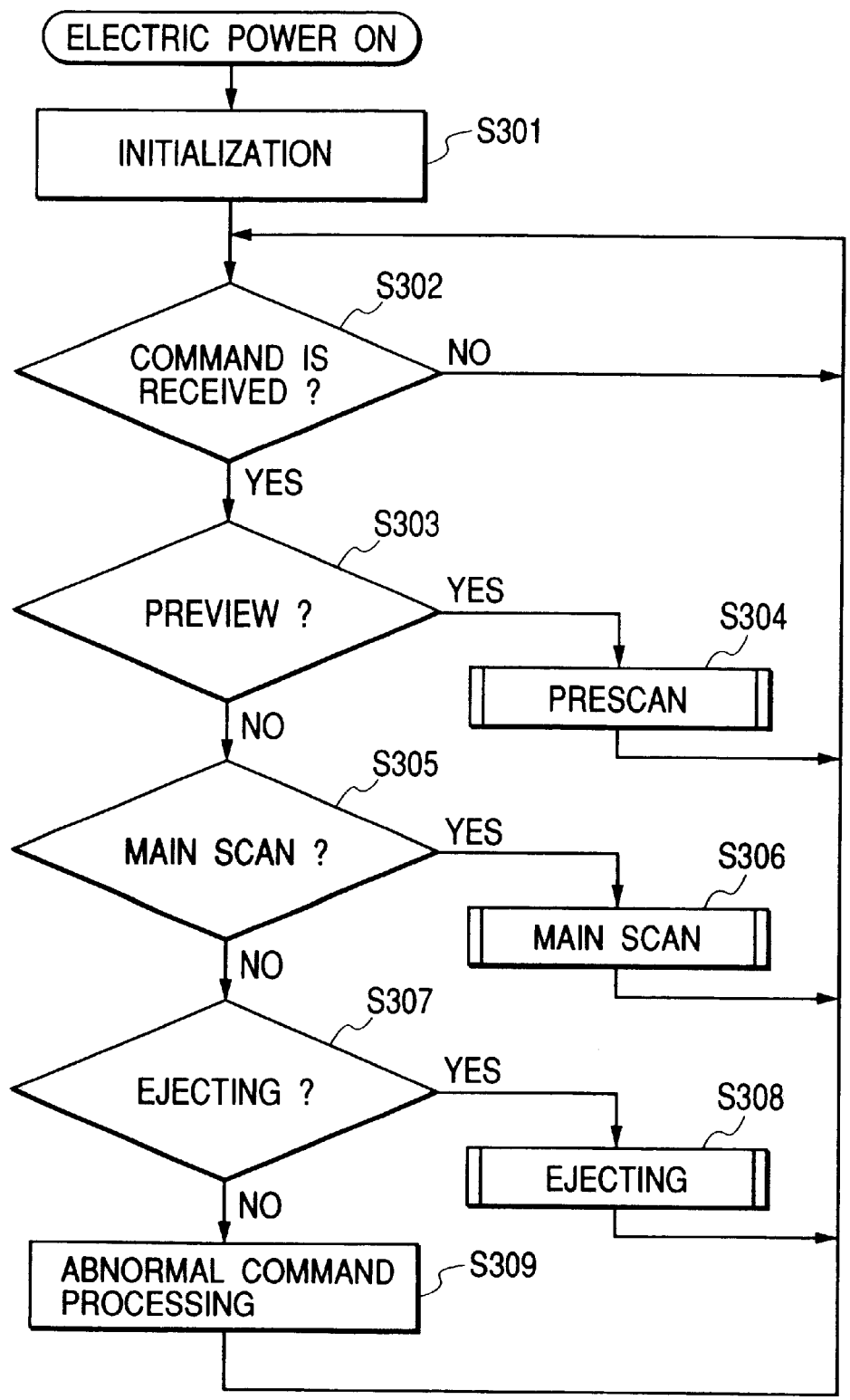
FIG. 3 is a main flowchart showing the entire operation flow of the image reading apparatus according to the first embodiment of the present invention.
Figure 4:
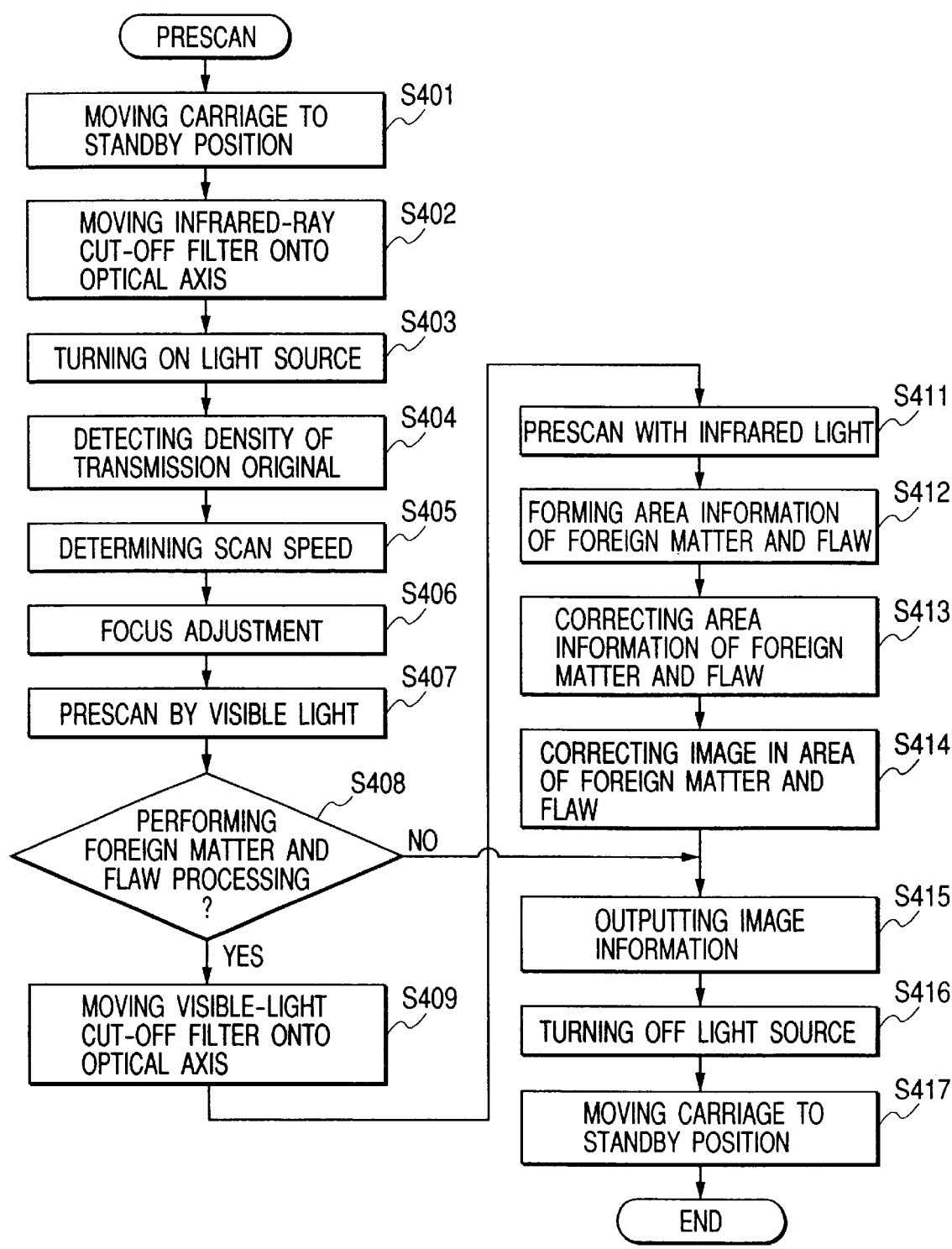
FIG. 4 shows a subroutine of the operation flow during prescan in the image reading apparatus according to the first embodiment of the present invention.
Figure 5:
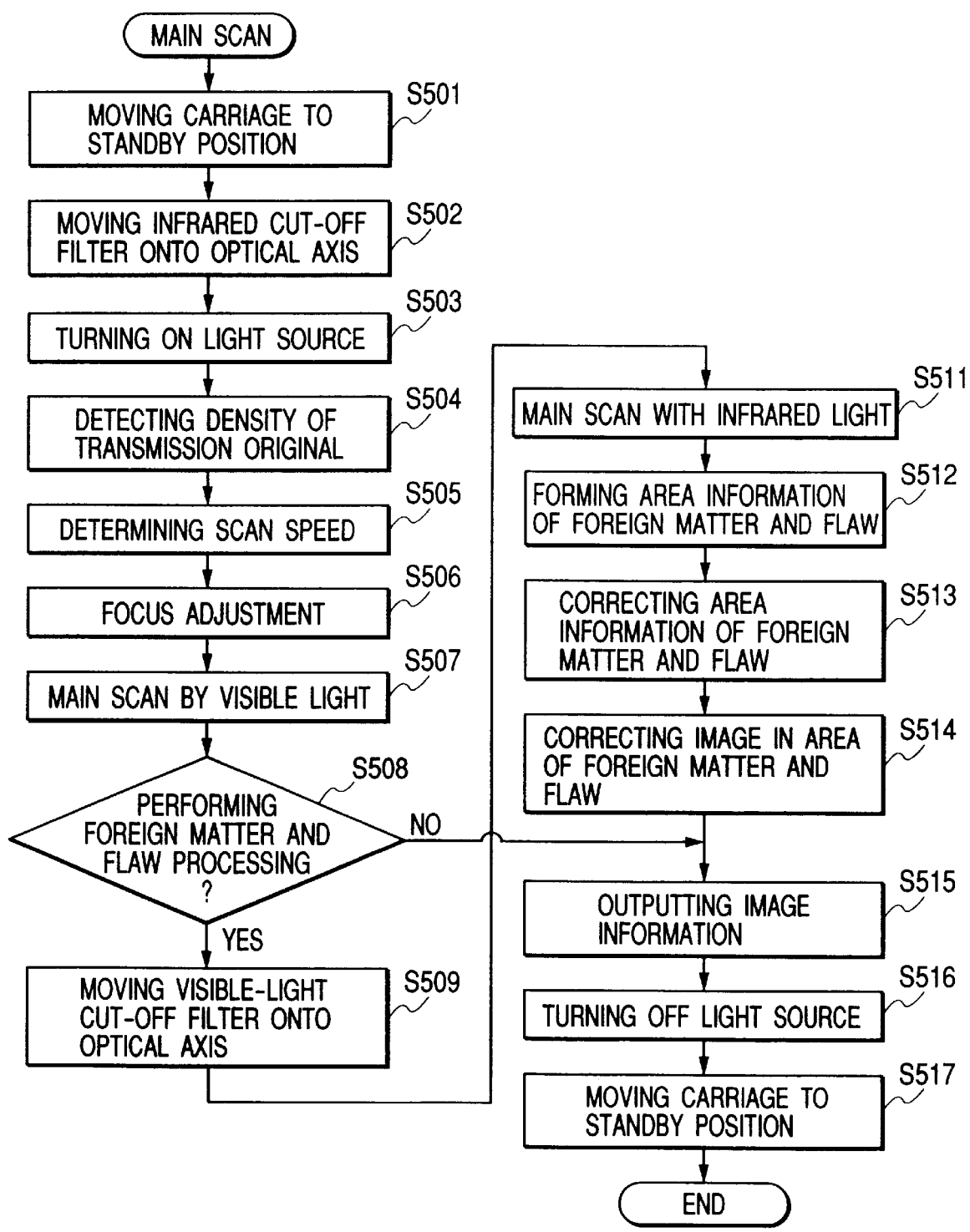
FIG. 5 shows a subroutine of the operation flow during main scan in the image reading apparatus according to the first embodiment of the present invention.
Figure 6:
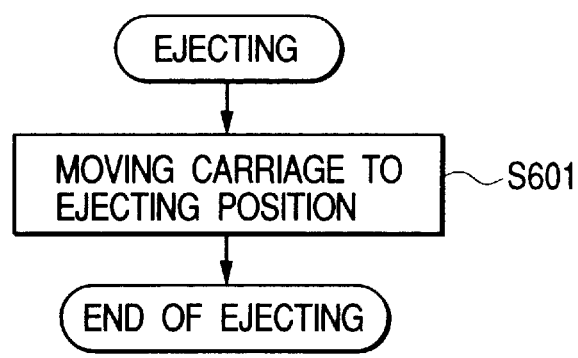
FIG. 6 shows a subroutine of the operation flow during ejecting in the image reading apparatus according to the first embodiment of the present invention.

FIG. 3 is a flowchart showing the main routine of the entire operation flow of the image reading apparatus S according to the present embodiment, and FIGS. 4 to 6 are flowcharts showing the subroutine of each operation flow of a prescan sequence, main scan sequence, and ejecting sequence.

First, the main flow will be described with reference to FIG. 3. Here, the description is performed by assuming that the power of the external equipment 18 such as the personal computer has been already turned on.

In step S301, when the electric power of the main body of the image reading apparatus S is turned on, the system controller 20 performs various initializations. This includes, for example, the memory check of the offset RAM 21, the drive check of various motors 6, 10, black level correction, shading correction, SCSI controller initial setting, and the like. When the initialization ends in the step S301, the flow advances to the next step S302.

The step S302 enters a standby state in which command reception from the external equipment 18 is waited for. When the user inputs an action command to the image reading apparatus S by the application of the external equipment 18, the standby state is canceled, thereby advancing to the next step S303.

In steps S303 to S308, the type of the command from the external equipment 18 is judged.

It is judged in the step S303 whether the command from the external equipment 18 is a prescan instruction or not. When it is judged that the command is the prescan instruction, the flow advances to the step S304, and when it is judged that the command is not the prescan instruction, the flow advances to the step S305.

After the prescan sequence is performed in the step S304, the flow returns to the step S302 to wait for another command reception. Additionally, the details of the prescan sequence in the step S304 will be described later with reference to FIG. 4.

It is judged in the step S305 whether the command from the external equipment 18 is a main scan instruction or not. Subsequently, when it is judged that the command is the main scan instruction, the flow advances to the step S306, and when it is judged that the command is not the main scan instruction, the flow advances to the step S307.

After the main scan sequence is performed in the step S306, the flow returns to the step S302 to wait for another command reception. Additionally, the details of the main scan sequence in the step S306 will be described later with reference to FIG. 5.

It is judged in the step S307 whether the command from the external equipment 18 is an ejecting instruction or not. Subsequently, when it is judged that the command is the ejecting instruction, the flow advances to the step S308, and when it is judged that the command is not the ejecting instruction, the flow advances to the step S309.

After the ejecting sequence is performed in the step S308, the flow returns to the step S302 to wait for another command reception. Additionally, the details of the ejecting sequence in the step S308 will be described later with reference to FIG. 6.

In the step S309, it is judged that the command (abnormal command) which cannot be detected by the command reception content check of the steps S303 to S307 is received, an abnormal command processing is performed, and the flow returns to the step S302 to wait for another command reception. Additionally, as the abnormal command processing in the step S309, for example, an abnormal alarm is given to the external equipment 18 to notify the user that the command is abnormal by the monitor, and the like.

Various subroutines will next be described with reference to FIGS. 4 to 6.

First, the prescan sequence will be described with reference to FIG. 4.

In step S401, the carriage 1 is moved to an initial position and placed in a standby state, and the flow then advances to step S402. Here, the initial position of the carriage 1 refers to the position where the scanning of the image of the transmission original 2 starts, that is, the state in which the end or the vicinity of the end of any image of the transmission original 2 is present on the optical axis.

In step S402, the position of the filter 9 is detected by the filter position detection sensor 11, and the detected information is read by the system controller 20. Subsequently, the filter motor 10 is driven to place the infrared-light cut-off filter 9a on the optical axis, and the infrared-light cut-off filter 9a is moved onto the optical axis. After the processing of this step S402 ends, the flow advances to the next step S403.

In the step S403, the system controller 20 drives the light source turn-on circuit 12 to turn on the light source 3, thereby advancing to the next step S404.

In the step S404, the sub-scan motor 6 is driven, the optical axis is positioned in the range of the image of the transmission original 2 (e.g., around the middle of the transmission original 2), the light amount data is inputted in the line sensor 5, gain adjustment is performed to set this value to an adequate value and exposure adjustment is then performed. Thereafter, after the transmission original 2 is moved to the initial position, the flow advances to next step S405.

In the step S405, the drive speed of the sub-scan motor 6 during prescan is determined from the processing result in the step S404. Specifically, when the light amount is very small, and a sufficient light amount cannot be obtained only with the gain adjustment, the drive speed of the sub-scan motor 6 is decelerated. After the processing of this step S405 ends, the flow advances to the next step S406.

In the step S406, the holder frame 28 is driven by the focus motor 26, the focus adjustment is performed, and the flow then advances to the next step S407.

In the step S407, the prescan operation by the visible light for prescanning starts. In this case, when the prescan range is designated by the command from the external equipment 18, the designation is set to the image processing circuit 15 to perform the scan. Subsequently, the generated image data is stored in the offset RAM 21. After the processing of this step S407 ends, the flow advances to the next step S408.

It is judged in the step S408 whether the command to perform the foreign matter and flaw processing is received or not during the reception of the command from the external equipment 18 (step S302 in FIG. 3). Subsequently, when it is judged that the command to perform the foreign matter/flaw correction processing is received, the flow advances to step S409, and when it is judged that the command to perform the foreign matter and flaw processing is not received, the flow advances to step S415.

In the step S409, the position of the filter 9 is detected by the filter position detection sensor 11, and read by the system controller 20. Subsequently, the filter motor 10 is driven to place the visible-light cut-off filter 9b on the optical axis, and the visible-light cut-off filter 9b is moved onto the optical axis. After the processing of the step S409 ends, the flow advances to the next step S411.

In the step S411, after the prescan operation by the infrared light starts to detect the foreign matter and flaw on the transmission original 2, the flow advances to the next step S412.

In the step S412, the area information of the foreign matter and flaw on the transmission original 2 is formed based on the image information by the infrared light extracted in the step S411.

Subsequently, in the step S413, the area information of the foreign matter and flaw on the transmission original 2 defined by the step S412 is corrected, and the flow advances to the next step S414.

In the step S414, the image information in the foreign matter and flaw area on the transmission original 2 defined by the step S413 is corrected (modified). For the correction method, the example described in the related art, and the like are considered. After the processing of this step S414 ends, the flow advances to the next step S415.

In the step S415, the image information formed in the step S407 or S414 is outputted to the external equipment 18 via the interface 17. After the processing of this step S415 ends, the flow advances to the next step S416.

In the step S416, the light source turn-on circuit 12 turns off the light source 3 on the instruction of the system controller 20. After the processing of this step S416 ends, the flow advances to the next step S417.

In the step S417, when the input of the prescan image is completed, the drive pulses of the sub-scan motor 6 and line sensor 5 are stopped, the transmission original 2 is moved back to the initial position to provide the standby state, and then the present processing operation ends.

With the processings described above, the prescan sequence ends, the flow returns to the main routine of FIG. 3, and the command reception standby state (step S302) is provided.

The main scan sequence will next be described with reference to FIG. 5.

The main scan sequence shown in FIG. 5 is basically the same as the above-described prescan sequence of FIG. 4. The main scan sequence is different only in that the degree of the selection of the image extraction resolution is increased.

Specifically, the step S407 of the prescan with the visible light in FIG. 4 is different from step S507 of main scan with the visible light in FIG. 5, and the step S411 of the prescan with the infrared light in FIG. 4 is different from step S511 of the main scan with the infrared light in FIG. 5, but steps S501 to S506, S508, S509, S512 to S517 in FIG. 5 are the same as the steps S401 to S406, S408, S409, S412 to S417 in FIG. 4, and the detailed description thereof is omitted.

The ejecting sequence will next be described with reference to FIG. 6.

After in step S601 the sub-scan motor 6 is driven to move the carriage 1 to the ejecting position, the present processing operation ends.

The ejecting sequence ends as described above, the flow returns to the main routine of FIG. 3, and the command reception standby state (step S302) is provided.

The method of correcting the foreign matter and flaw area information performed in the step S413 of FIG. 4 and step S513 of FIG. 5 will next be described with reference to FIG. 7.

Figure 7:
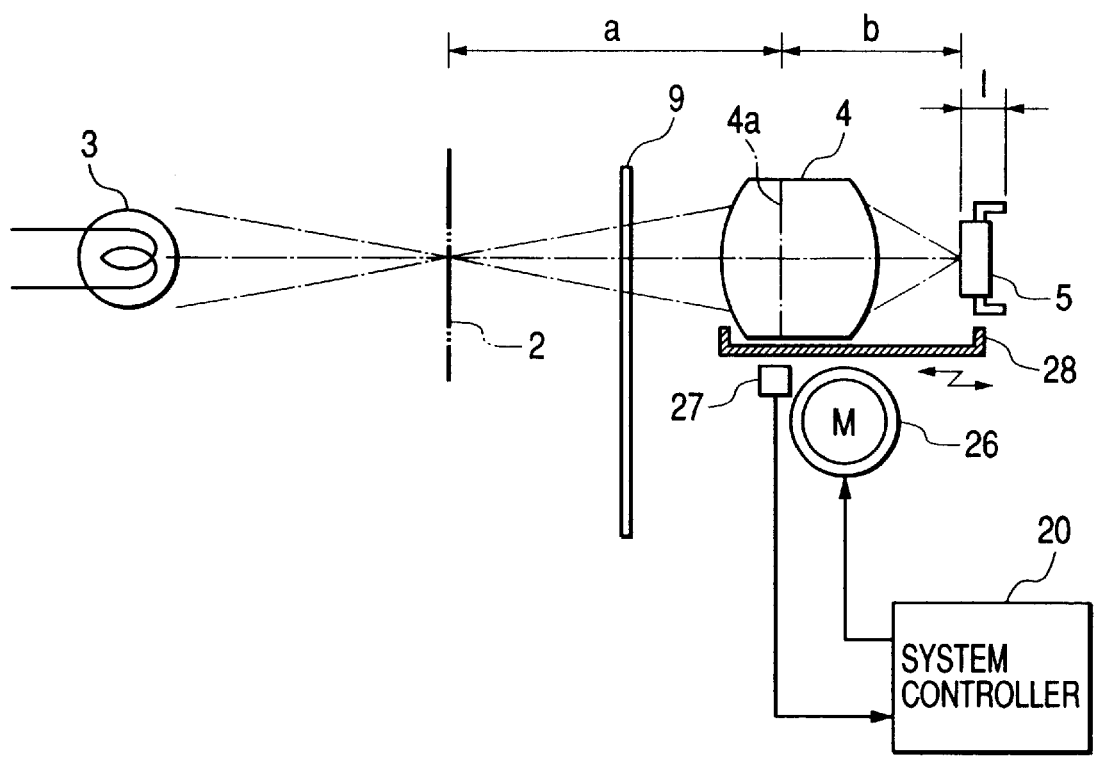
FIG. 7 is a diagram showing that an optical path is changed from a visible-light focused state to an infrared-light focused state in the image reading apparatus according to the first embodiment of the present invention.

FIG. 7 is a diagram showing that by driving the focus motor 26 to change the optical path length, the visible-light image is focused, and in FIG. 7 the same parts as those of FIGS. 1 and 2 are denoted with the same reference numerals.

In FIG. 7, the best focused position of the infrared-light image is longer than that of the visible-light image by 1. The position of the transmission original 2 in the optical axis direction is substantially constant, and the image forming lens 4 can also be manufactured at a relatively low cost while keeping an image forming performance to be close to a designed value. Therefore, image forming magnification $\beta$ by the visible light and image forming magnification $\beta'$ by the infrared light can be known in advance by calculation. As a result, magnification change ratio "$\beta'/\beta$" can univocally be determined, and the foreign matter and flaw area can exactly be grasped in accordance with this ratio.

Figure 8A:
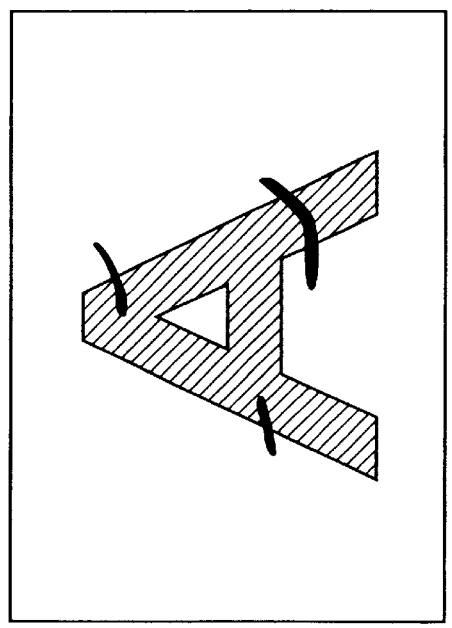
FIGS. 8A, 8B and 8C are diagrams showing that a foreign matter/flaw area is detected in the image reading apparatus according to the first embodiment of the present invention.
Figure 8B:
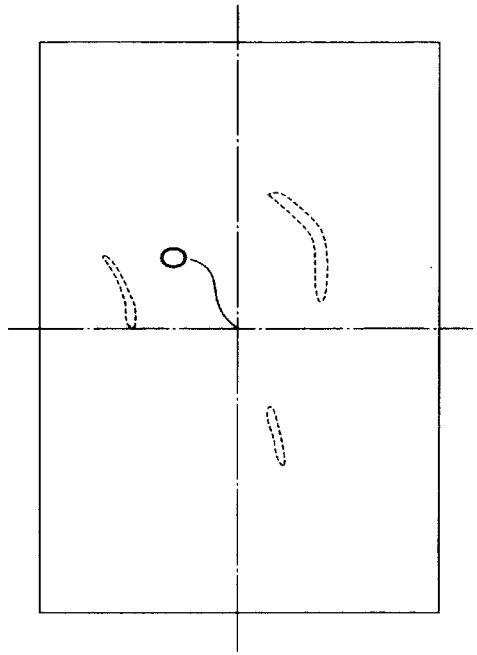
Figure 8C:
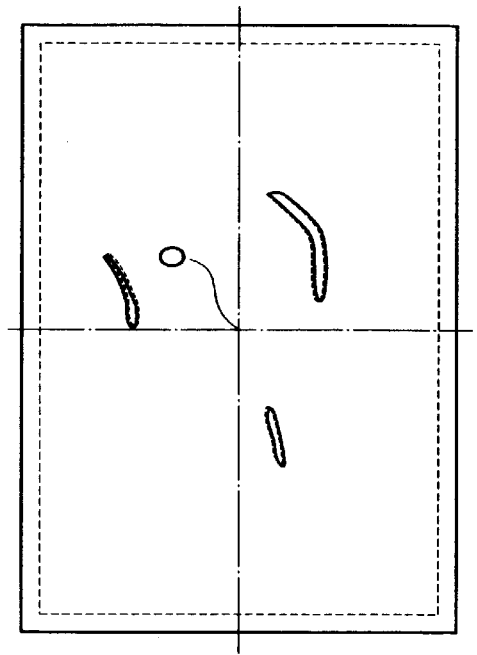

This state is shown in FIGS. 8A to 8C, FIG. 8A shows the image extracted by the visible light, FIG. 8B shows the image obtained when the foreign matter and flaw are detected by the infrared light according to the present embodiment, and FIG. 8C shows the image obtained by multiplying the image of FIG. 8B by the above-described factor "$\beta'/\beta$" to correct the foreign matter and flaw area. In FIG. 8C, a dotted line shows the image of FIG. 8B, and a solid line shows the corrected image.

Since the infrared-light image of FIG. 8B is smaller than the visible-light image of FIG. 8A by the inverse number of the factor "$\beta'/\beta$", by multiplying the factor "$\beta'/\beta$" centering on an image center O, the infrared-light image is extended to provide the image shown by the solid line in FIG. 8C. Thereby, the foreign matter and flaw position of the infrared-light image can be corrected and placed in the same position as that of the foreign matter and flaw area of the original image.

Moreover, another method can comprise: grasping the foreign matter and flaw position by the infrared-light image as the coordinate information by using the image center O as an origin, and multiplying the image by the factor "$\beta'/\beta$", so that the foreign matter and flaw position can similarly be corrected.

Moreover, in the image reading apparatus of the present embodiment, by reading and executing the control program stored in the memory medium by the computer as the reading means, the above-described function of the present embodiment is realized, but the present invention is not limited to this, and needless to say, a case is also included in which a part or the whole of the actual processing of the operating system (OS) on the computer is performed based on the instruction of the control program and the function of the above-described embodiment is realized by the processing.

Furthermore, as the memory medium for storing the control program, for example, a floppy disk, hard disk, optical disk, magnetic optical disk, compact disk read only memory (CD-ROM), compact disk recordable (CD-R), magnetic tape, nonvolatile memory card, ROM chip, and the like can be used.

A second embodiment of the present invention will next be described with reference to FIGS. 9 to 11. Additionally, the system constitution provided with the image reading apparatus of the present embodiment is the same as that of FIG. 1 of the above-described first embodiment, the main flow of the image reading apparatus of the present embodiment is the same as that of FIG. 3 of the above-described first embodiment, and the subroutine for the ejecting of the image reading apparatus of the present embodiment is the same as that of FIG. 6 of the above-described first embodiment, and the description thereof is therefore omitted.

Figure 9:
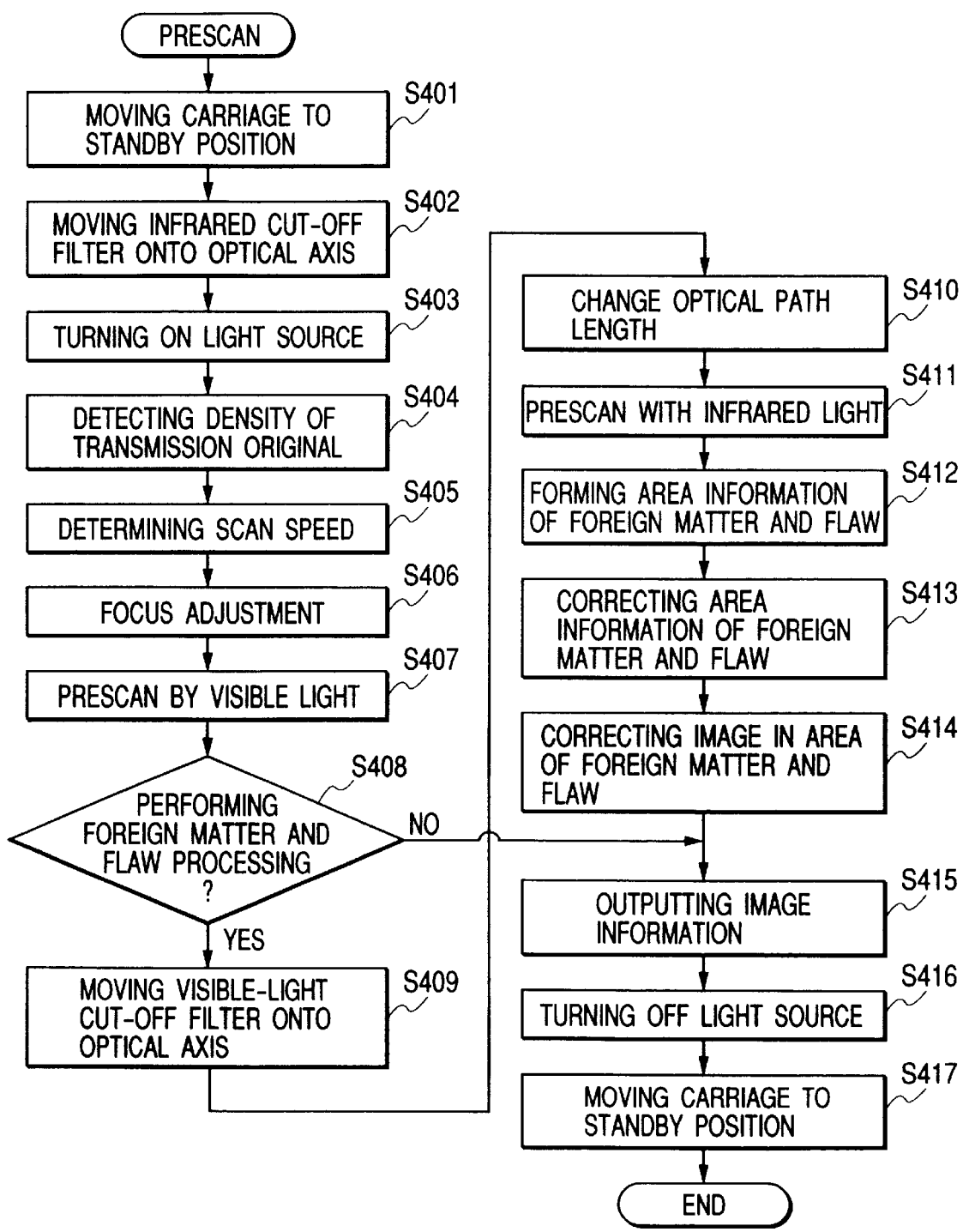
FIG. 9 is a flowchart showing the operation flow during prescan in the image reading apparatus according to a second embodiment of the present invention.
Figure 10:
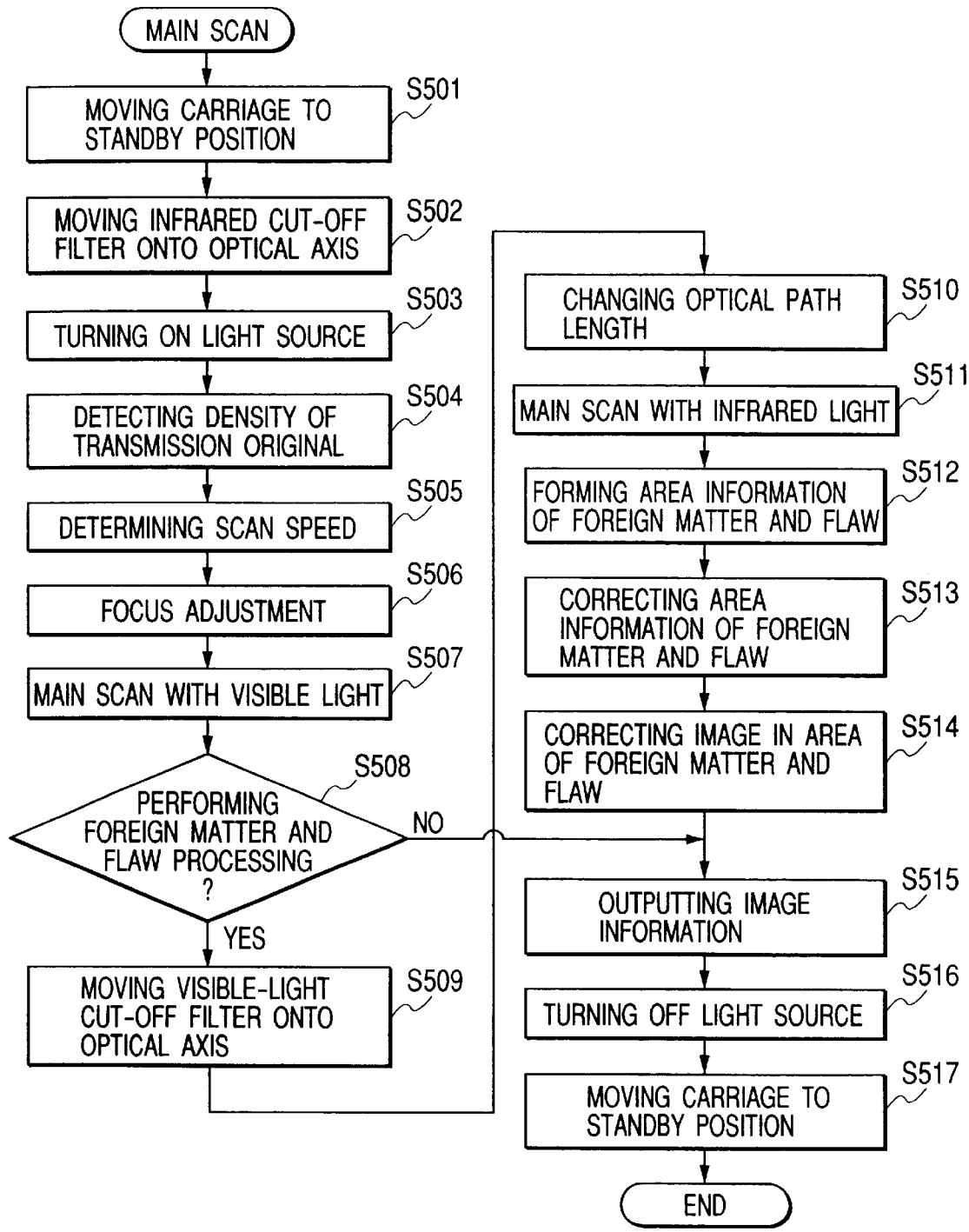
FIG. 10 is a flowchart showing the operation flow during main scan in the image reading apparatus according to the second embodiment of the present invention.

FIG. 9 shows the subroutine for the prescan of the image reading apparatus of the present embodiment, and FIG. 10 shows the subroutine for the main scan. FIGS. 9 and 10 are different from FIGS. 4 and 5 of the first embodiment, in that steps S410 and S510 are added. In the steps S410 and S510, the focus motor 26 is driven, and the holder frame 28 is moved in the optical axis direction to change the optical path length. For the change amount, since the wavelength is known in advance by the properties of the light source 3, infrared-light cut-off filter 9a and visible-light cut-off filter 9b, a difference between the focus position of the visible-light image and the focus position of the infrared-light image is obtained as the movement amount. After the processings of the steps S410, S510 end, the flow advances to the next steps S411, S511, respectively. Thereafter, the processing shown in the first embodiment is performed, and the image with the foreign matter and flaw is corrected.

Figure 11A:
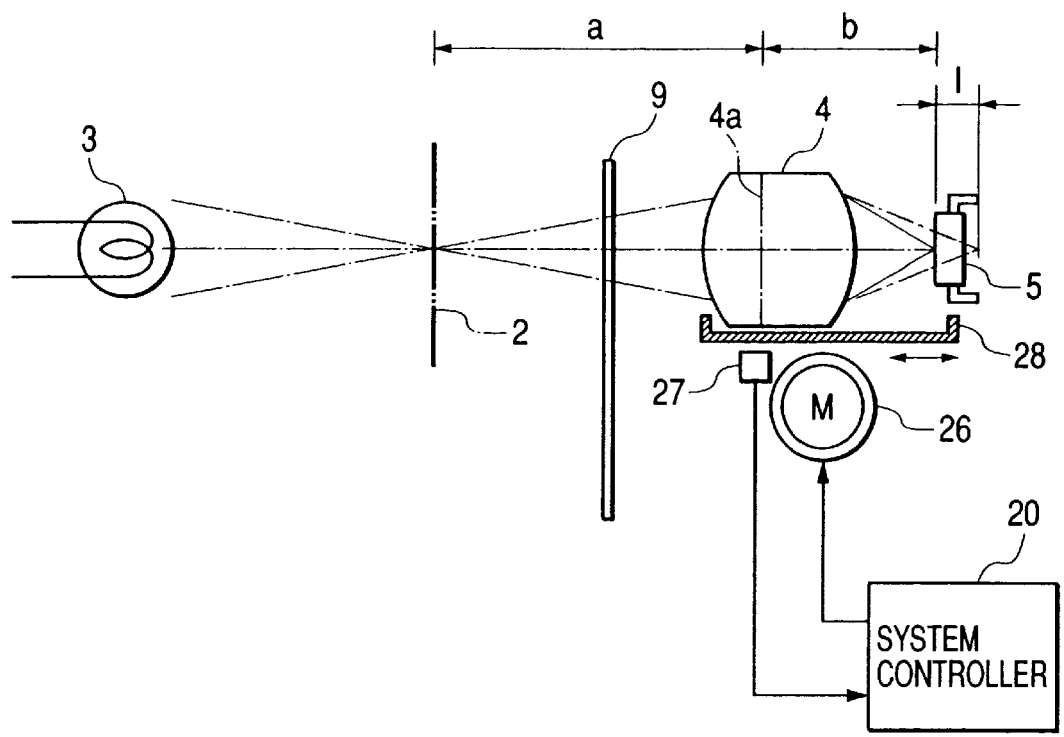
FIGS. 11A and 11B are diagrams showing that the optical path is changed from the visible-light focused state to the infrared-light focused state in the image reading apparatus according to the second embodiment of the present invention.
Figure 11B:
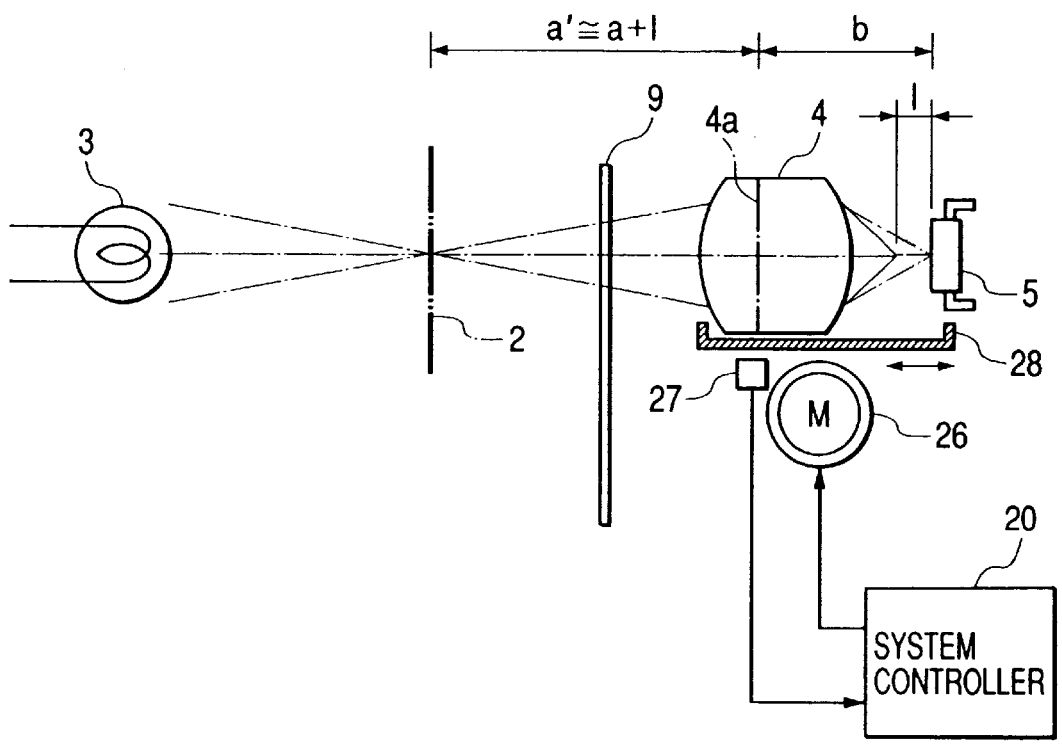

FIGS. 11A and 11B are diagrams showing that by driving the focus motor 26 to change the optical path length, the state in which the visible-light image is focused turns to the state in which the infrared-light image is focused, and in the drawings, a visible flux is shown by a solid line and an infrared flux is shown by a dotted line.

Moreover, in the drawings, the same parts as those of FIGS. 1 and 2 are denoted with the same reference numerals.

FIG. 11A shows that the visible-light image is focused, and the best focused position of the infrared-light image is longer than that of the visible-light image by 1. Moreover, FIG. 11B shows that the holder frame 28 is moved from the state of FIG. 11A and that the infrared-light image is focused.

Since the position of the transmission original 2 in the optical axis direction is substantially constant, and in this case the movement direction and amount of the holder frame 28 are also substantially constant, by determining the values in advance, the focused infrared image can easily be obtained without performing the sequence of the calculation or the like. Here, the magnification p is represented by a ratio b/a of a distance a between an object (film surface: the surface of the transmission original 2) and the position of main point 4a of the image forming lens 4 to a distance b between the position of main point 4a of the image forming lens 4 and the focused surface. In the present embodiment, the image forming lens 4 and line sensor 5 are integrally held by the holder frame 28, and the above-described distance b is constant. Therefore, when the optical path length is changed, the above-described distance a changes to a'. Here, since a' indicates a determined value, the magnification β' of the infrared-light image can also be univocally defined as b/a'.

Specifically, since the magnification change ratio of the visible-light image and infrared-light image is β'/β=a/a', by correcting the foreign matter and flaw positions in accordance with the ratio, the foreign matter and flaw area can correctly be grasped.

Additionally, since the other constitutions and operations in the present embodiment are the same as those of the first embodiment, the description thereof is omitted.

A third embodiment of the present invention will next be described with reference to FIG. 12. Additionally, the system constitution provided with the image reading apparatus of the present embodiment is the same as that of FIG. 1 of the first embodiment, the constitution of the image reading apparatus of the present embodiment is the same as that of FIG. 2 of the first embodiment, the main flow of the image reading apparatus of the present embodiment is the same as that of FIG. 3 of the first embodiment, the subroutine for the prescan of the image reading apparatus of the present embodiment is the same as that of FIG. 9 of the second embodiment, the subroutine for ejection of the image reading apparatus of the present embodiment is the same as that of FIG. 6 of the first embodiment, and the description thereof is therefore omitted.

Figure 12:
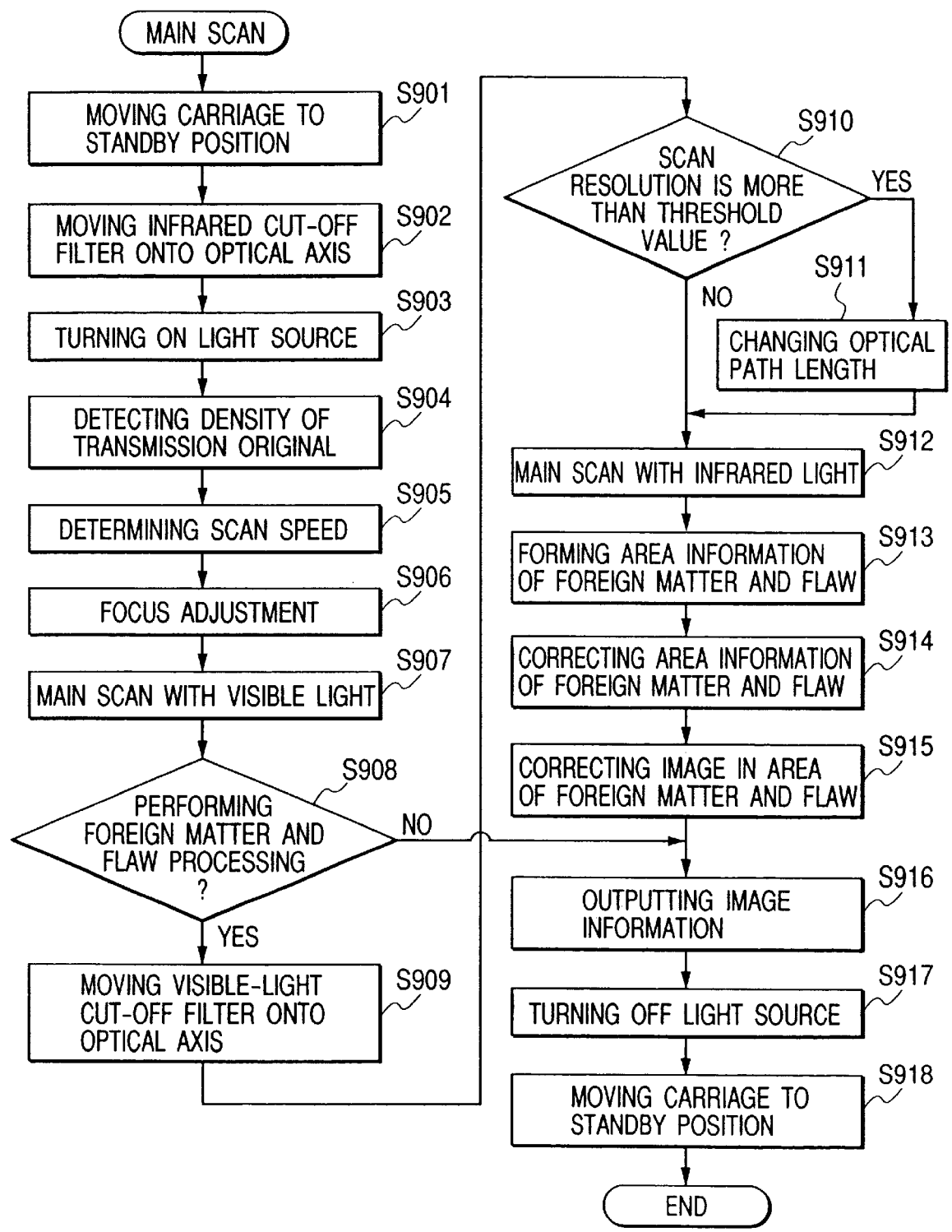
FIG. 12 shows a subroutine of the operation flow during main scan in the image reading apparatus according to a third embodiment of the present invention.

FIG. 12 shows the subroutine for the main scan of the image reading apparatus of the present embodiment, and FIG. 12 is different from FIG. 10 of the second embodiment, in that the processing of step S910 is added to FIG. 10.

Here, since the steps S901 to S909, S911 to S918 in FIG. 12 are the same as the steps S501 to S517 of FIG. 10, the description thereof is omitted, and only the processing step peculiar to the present embodiment will be described.

In the first embodiment, the optical path length shift (optical path length change) is sure to be performed during the image extraction by the infrared light, but in the present embodiment the optical path length shift is not performed when the scan resolution indicates a certain value or less. This is because at the coarse scan resolution the error of the foreign matter and flaw area by the magnification difference exerts no influence on the foreign matter and flaw correction.

Therefore, in the present embodiment, after the visible-light cut-off filter 9b is moved onto the optical axis in the step S909, it is judged in step S910 whether the scan resolution is more than the predetermined threshold value of the scan resolution or not. Subsequently, when it is judged that the scan resolution is more than the threshold value, the flow advances to step S911 to change the optical path length, and then advances to step S912. Moreover, when it is judged that the scan resolution is not more than the threshold value, the flow advances to the step S912 without changing the optical path length, and the main scan by the infrared light is performed in this step S912.

Thereafter, the processing shown in the first embodiment is performed, and the image with the foreign matter and flaw is corrected.

Additionally, since the constitutions and operations in the present embodiment are the same as those of the second embodiment, the description thereof is omitted.

A fourth embodiment of the present invention will next be described with reference to FIGS. 13 to 15.

Additionally, since the through-view state of the internal constitution of the image reading apparatus of the present embodiment is the same as that of FIG. 2 of the first embodiment, the description will be performed with reference to FIG. 2. Moreover, the main flow of the image reading apparatus of the present embodiment is the same as that of FIG. 3 of the first embodiment, the subroutine for the ejection of the image reading apparatus of the present embodiment is the same as that of FIG. 6 of the first embodiment, and the description thereof is therefore omitted.

Figure 13:
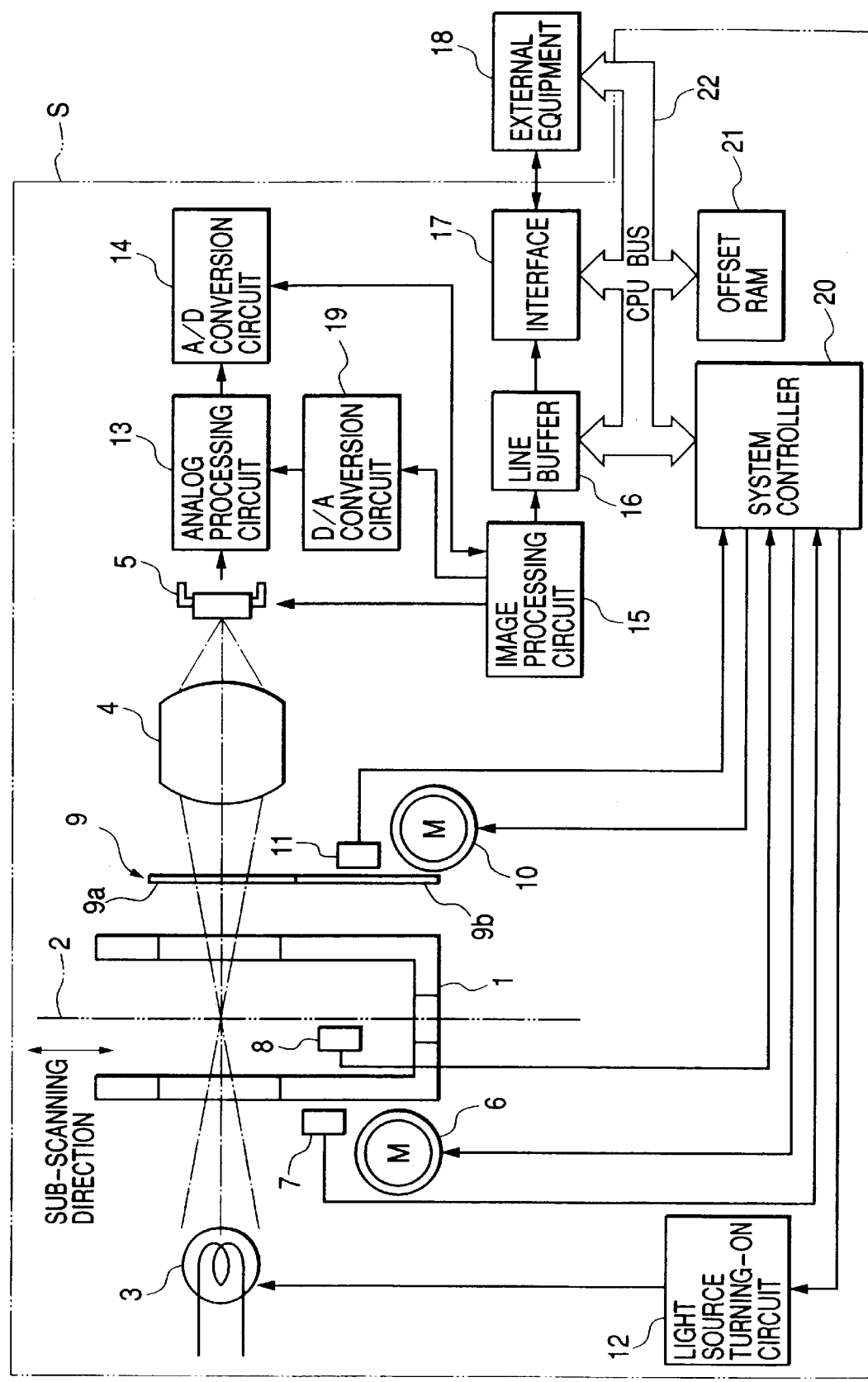
FIG. 13 is a block diagram showing the system constitution provided with the image reading apparatus according to a fourth embodiment of the present invention.

FIG. 13 is a block diagram showing the system constitution provided with the image reading apparatus of the present embodiment, and in FIG. 13 the same parts as those of FIG. 1 of the first embodiment are denoted with the same reference numerals. FIG. 13 is different from FIG. 1, in that the focus motor 26, focus position sensor 27 and holder frame 28 are deleted from the constitution of FIG. 1.

The system operation will next be described in which the image reading apparatus S of the present embodiment constituted as described is used to convert the image of the transmission original 2 to the electric signal and take the signal into the external equipment 18.

The transmission original 2 is fixedly held on the carriage 1 by the transmission original holder (not shown), and the like, and connection is established by the sub-scan motor 6 via the power transmission mechanism such as the reduction machine (not shown) so that driving is possible. In the power transmission mechanism, a minimum feed pitch is adaptively set in accordance with the reading resolution of the transmission original 2.

The light source 3 is constituted of a line-shaped fluorescent tube containing inactive gas such as xenon or mercury, and is disposed substantially parallel to the main scan direction of the line sensor 5. Moreover, the light source 3 emits light of wavelengths corresponding to blue, green, red. The light source 3 as the fluorescent tube is turned on by the light source turn-on circuit 12 which is a so-called inverter circuit.

The image forming lens 4 forms the light radiated to the transmission original 2 from the light source 3 into an image on the line sensor 5. The distance between the optical axes of the image forming lens 4 and line sensor 5 is adjusted in advance. Therefore, the image of the transmission original 2 is formed on the line sensor 5 at the definite magnification. Moreover, the inclination of the transmission original 2 and line sensor 5 in the main scan direction is adjusted in advance, so that the strain of the image is prevented. When the position of the transmission original 2 in the optical axis direction differs with each adapter, or is not precisely determined, or when the focus depth of the image forming lens 4 is shallow, a focus adjustment system for guiding the image forming lens 4 in the optical axis direction may be constituted by a motor, and the like. In the present embodiment, this focus adjustment system is omitted.

For the line sensor 5, a three-line sensor including three lines (R, G, B) is used in the present embodiment. In this three-line sensor, the respective light receiving parts are arranged in parallel at definite intervals. The image signal generated by the line sensor 5 is converted to a digital signal by the A/D conversion circuit 14, and further converted to the image data by the image processing circuit 15, the image data is added to the analog processing circuit 13 via the D/A conversion circuit 19, and a stable black level signal can be obtained.

The image processing circuit 15 is constituted of a gate array, and the like, subjects the digital image data converted by the A/D conversion circuit 14 to various processings such as a digital automatic gain control (AGC) processing, shading correction processing, γ correction processing, color data synthesis processing, resolution/magnification conversion processing, filter processing, masking processing, binarizing/automatic exposure (AE) processing, negative/positive reversal processing, and mirror image processing, and further outputs the operation clock of the line sensor 5 and sample timing signal of the A/D conversion circuit 14.

In the digital AGC processing, the dynamic range of each inputted color signal is adjusted. In the shading correction processing, corrected/processed is the ununiformity in the light amount of the light source 3, the transmittance of the image forming lens 4, the sensitivity of the line sensor 5, and the like. In the γ correction processing, while the image contrast is adjusted, the input gradation is converted to the output gradation. In the color data synthesis processing, in order to correct the position interval deviation of each light receiving part of the line sensor 5, the image data is once accumulated in the offset RAM 21, and the gathered data is outputted as the color data of one line. In the resolution/magnification conversion processing, for the setting by the conversion parameter input from the system controller 20, the data is subjected to the thinning-out and adding processing. This is performed on the instruction from the external equipment 18.

In the filter processing, the processings such as a main scanning interpolation processing, sub-scanning interpolation processing, averaging processing, smoothing processing, and edge part processing are selectively performed in accordance with the gradation and resolution. In the masking processing, to correct the unnecessary light from the light source 3 and substantially idealizing the color characteristic, the processing is performed by multiplying each color data by the correction factor. In the binarizing/AE processing, particularly the green channel data is used to perform the processing on the instruction from the external equipment 18. For the negative/positive reversal processing, when the negative filter is set as the transmission original 2, the processing is performed on the instruction from the system controller 20. This is, for example, constituted by an exclusive-OR circuit. For the mirror image processing, the processing is performed by reading the data written into the offset RAM 21 from the reverse on the instruction from the external equipment 18.

The offset RAM 21 is prepared as the working area in performing the above-described image processing, and temporarily stores the image data. Moreover, the line buffer 16 temporarily saves the image data subjected to the above-described processing in the image processing circuit 15, and the image data is outputted to the external equipment 18 from the interface 17 of the SCSI controller or the like.

As described above, the system controller 20 is connected to the image processing circuit 15, line buffer 16, interface 17, and offset RAM 21 via the CPU bus 22 constituted by the address bus and data bus as shown in FIG. 13. This enables the respective circuits to mutually perform data communication.

In this constitution, the user of the image reading apparatus S gives a command to the system controller 20 through the external equipment 18. The command from the user is transmitted to the system controller 20-via the interface 17. Concretely, the user command includes the type of the transmission original 2, image reading range, reading resolution, main scan command, and whether or not to perform the foreign matter and flaw processing. By these user commands and the outputs from various detection circuits (sensors), the electric preparation and processing are performed in accordance with the flow appropriately programmed by the system controller 20.

The operation of converting the image of the transmission original 2 to the electric signal will next be described with reference to FIGS. 14 and 15.

Additionally, since the main routine of the entire operation flow of the image reading apparatus S of the present embodiment is the same as that of FIG. 3 of the first embodiment, the description thereof is omitted.

Figure 14:
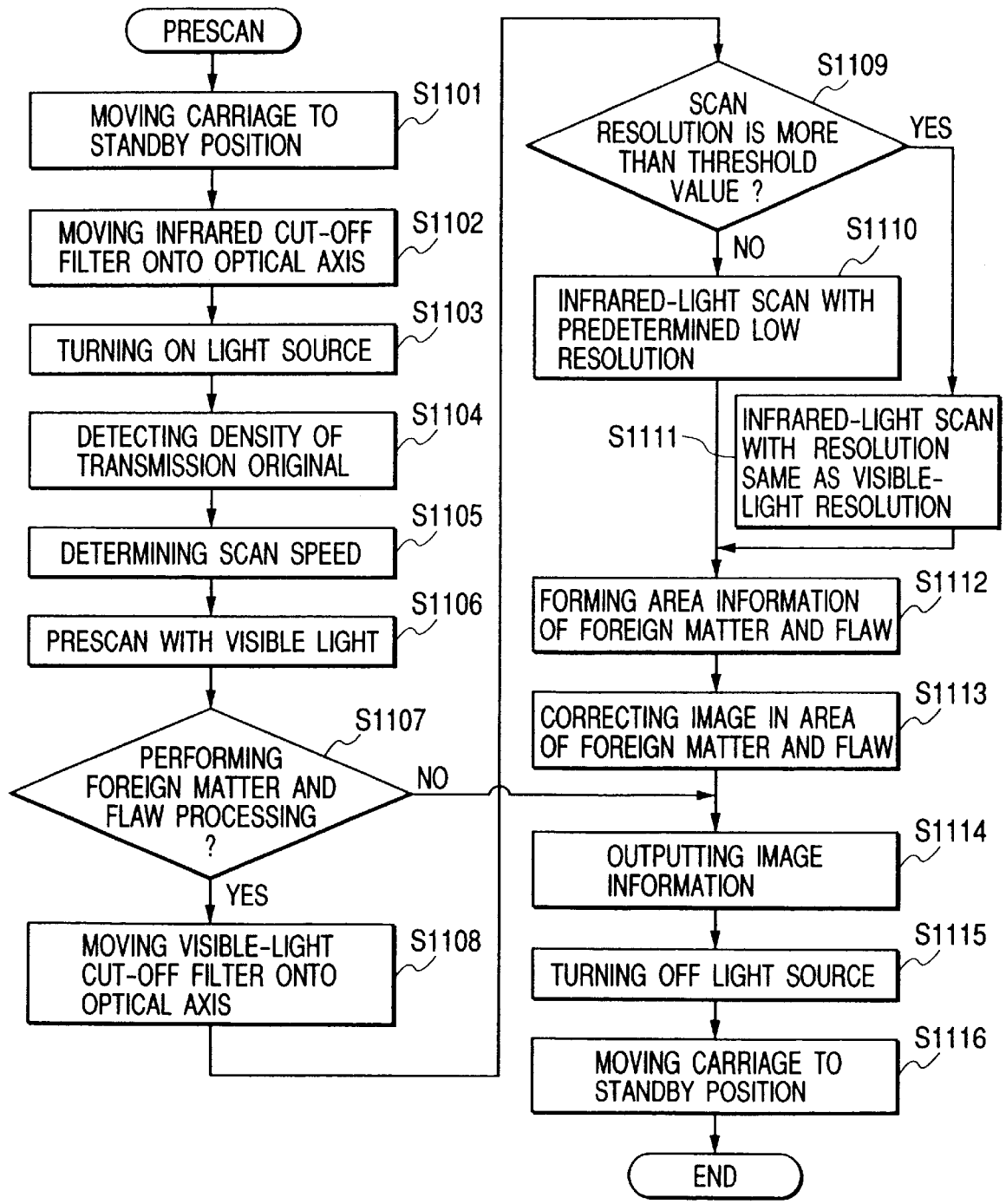
FIG. 14 shows a subroutine of the operation flow during prescan in the image reading apparatus according to the fourth embodiment of the present invention.
Figure 15:
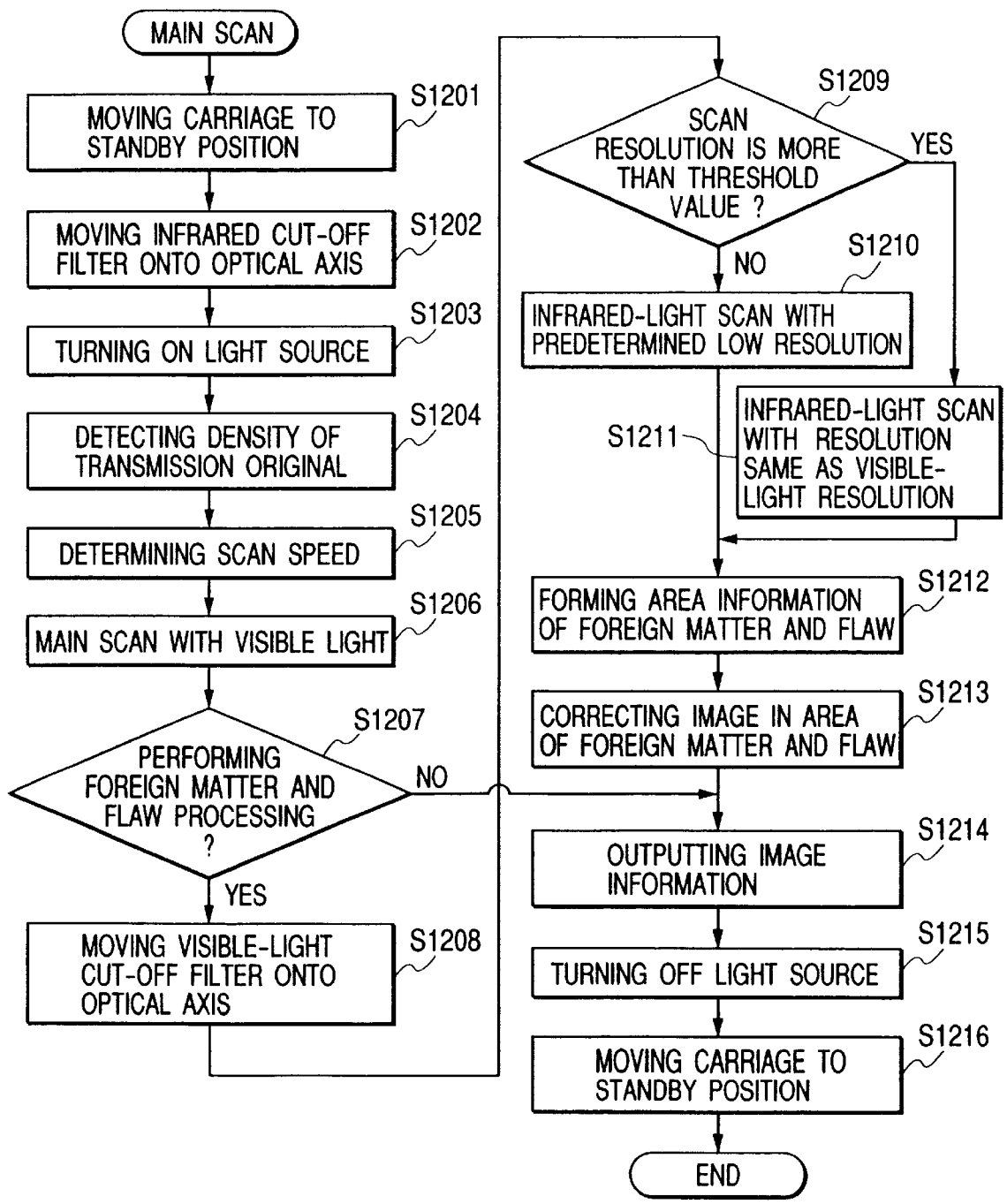
FIG. 15 shows a subroutine of the operation flow during main scan in the image reading apparatus according to the fourth embodiment of the present invention.

FIGS. 14 and 15 are flowcharts showing the subroutine of each operation flow of the prescan sequence and main scan sequence in the image reading apparatus S of the present embodiment.

First, the prescan sequence will be described with reference to FIG. 14.

Additionally, since steps S1101 to S1108 and S1112 to S1116 in FIG. 14 are the same as the steps S401 to S405, S407 to S409, S412, and S414 to S417 of FIG. 9 of the second embodiment, the description thereof is omitted, and only the processing step peculiar to the present embodiment will be described.

Specifically, in the step S1109, by referring to the prescan resolution received during the command reception from the external equipment 18 (step S302 of FIG. 3), it is judged whether the scan resolution is more than the predetermined threshold value. Subsequently, when it is judged that the scan resolution is not more than the threshold value, the flow advances to step S1110, and when it is determined that the scan resolution is more than the threshold value, the flow advances to step S1111.

In the step S1110, the scan operation for detecting the foreign matter and flaw starts. Here, since the scan resolution/is smaller than the threshold value in the step S1109, the infrared scanning is performed with the predetermined low resolution. In this case, when the prescan range is designated by the command from the external equipment 18 similarly to the step S1106, this fact is set to the image processing circuit 15 to perform the scanning.

Moreover, in the step S1111, the scan operation for detecting the foreign matter and flaw starts. Here, since the scan resolution is larger than the threshold value in the step S1109, the infrared scanning is performed with the same resolution as the visible-light resolution. In this case, when the prescan range is designated by the command from the external equipment 18 similarly to the step S1106, this fact is set to the image processing circuit 15 to perform the scanning.

After the processing of the step S1110 or S1111 ends, in either case the flow advances to step S1112 to form the area information of the foreign matter and flaw on the transmission original 2 based on the image information by the infrared light taken in the step S1110 or S1111. The processing of the subsequent steps S1113 to S1116 is the same as that of the steps S414 to S417 of FIG. 9.

The main scan sequence of the image reading apparatus S of the present embodiment will next be described with reference to FIG. 15. Since the main scan sequence shown in FIG. 15 is basically the same as the prescan sequence shown in FIG. 14, and the main scan is different only in that the selection width of the image taking resolution is enlarged, the detailed description is omitted.

Furthermore, since the ejecting sequence of the image reading apparatus S of the present embodiment is the same as that of FIG. 6 of the first embodiment, the description is omitted.

Additionally, in the present embodiment, the example in which the scan resolution by the infrared light is changed in accordance with the visible-light scan resolution is described, but the present invention is not limited to this. When the visible-light scan resolution is higher than the threshold value, the infrared-light scan may be performed with the predetermined resolution. Moreover, instead of one threshold value, a plurality of stages of visible-light scan resolutions may be prepared and selected by the table in the system controller 20 so that the infrared-light scan resolution is determined in accordance with each of the plurality of stages of the prepared resolutions.

Furthermore, when the visible-light scan resolution is higher than the threshold value, the infrared-light scan is performed with the predetermined resolution, and when the visible-light scan resolution is lower than the threshold value, the infrared-light scan may be performed with the same resolution as the visible-light resolution.

A fifth embodiment will next be described with reference to FIG. 16.

Additionally, since the system constitution provided with the image reading apparatus of the present embodiment is the same as that of FIG. 13 of the fourth embodiment, and the through-view state of the internal constitution of the image reading apparatus of the present embodiment is the same as that of FIG. 2 of the first embodiment, the description will be performed with reference to these drawings. Moreover, since the main flow of the image reading apparatus of the present embodiment is the same as that of FIG. 3 of the first embodiment, and the subroutine for the ejecting of the image reading apparatus according to the present embodiment is the same as that of FIG. 6 of the first embodiment, the description is omitted.

Figure 16:
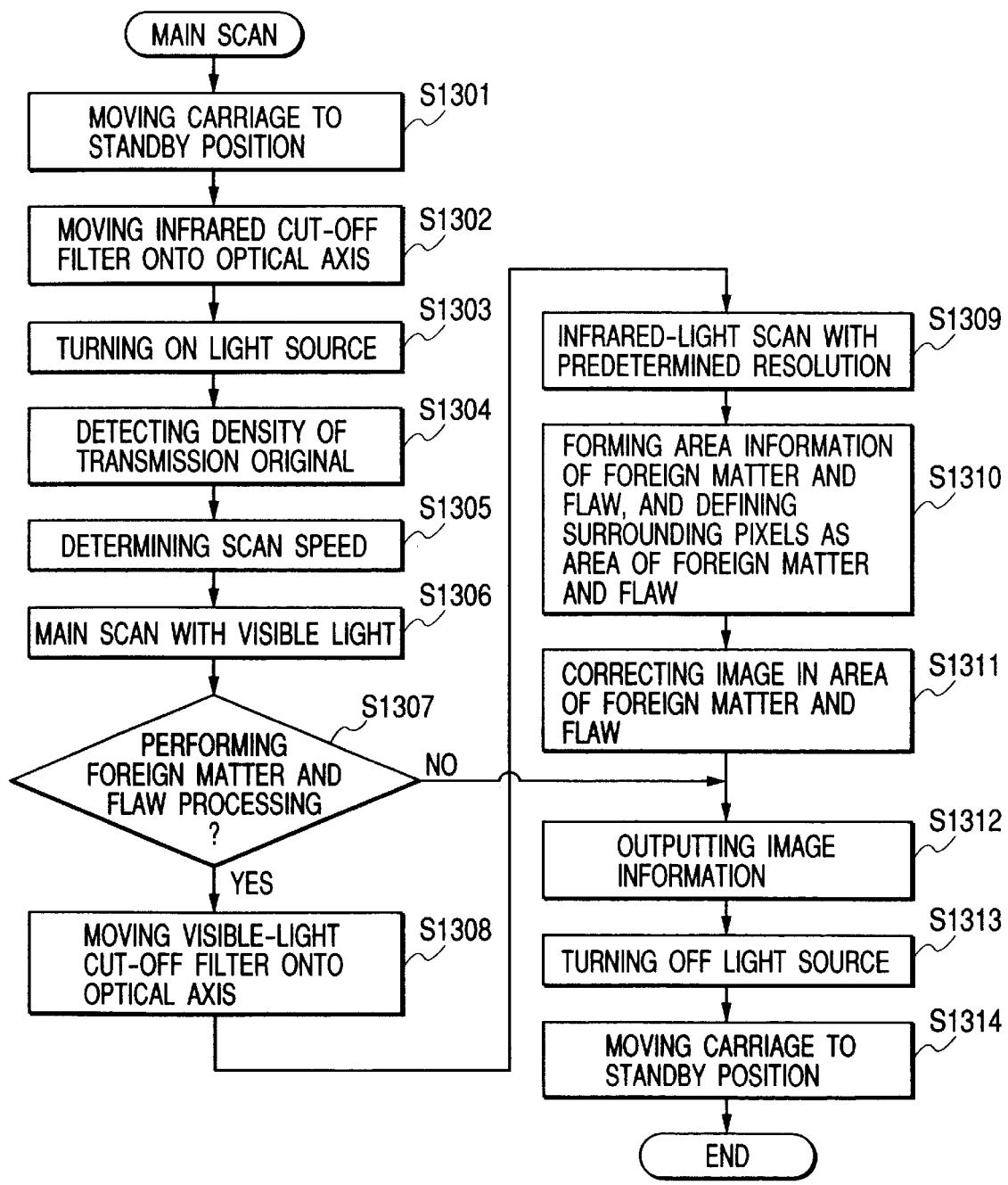
FIG. 16 shows a subroutine of the operation flow during main scan in the image reading apparatus according to a fifth embodiment of the present invention.

FIG. 16 is a flowchart showing the subroutine for the main scan of the image reading apparatus according to the present embodiment. FIG. 16 is different from FIG. 15 in that the branch shown by the steps S1209 to S1211 in FIG. 15 is deleted, and in step S1309 the infrared-light scan is simply performed with the predetermined resolution. This simplifies the sequence flow, and further shortens the processing time.

Moreover, for the foreign matter and flaw area information forming method shown in the step S1212 of FIG. 15, in the processing shown in FIG. 16, the area surrounding the area which is once judged to be the foreign matter and flaw is also defined as the foreign matter and flaw area. Specifically, a broader range is defined as the foreign matter and flaw area.

This eliminates the vagueness of the foreign matter and flaw area judgment performed by the infrared-light scan with a coarser resolution than that of the scan by the visible light, so that the foreign matter and flaw can securely be corrected. Moreover, by using the similar flow also in the prescan, the foreign matter and flaw is exactly corrected and the content is simplified.

A sixth embodiment of the present invention will next be described with reference to FIGS. 17 and 18.

Additionally, since the system constitution provided with the image reading apparatus of the present embodiment is the same as that of FIG. 13 of the fourth embodiment, and the through-view state of the internal constitution of the image reading apparatus of the present embodiment is the same as that of FIG. 2 of the first embodiment, the description will be performed with reference to these drawings. Moreover, since the main flow of the image reading apparatus of the present embodiment is the same as that of FIG.

3 of the first embodiment, and the subroutine for the ejecting of the image reading apparatus according to the present embodiment is the same as that of FIG. 6 of the first embodiment, the description is omitted.

The prescan sequence of the image reading apparatus of the present embodiment will be described with reference to FIG. 17. Additionally, since steps S1401 to S1406, S1408, S1409, S1411 to S1415 are the same as the steps S1101 to S1106, S1107, S1108, S1112 to S1116 of the fourth embodiment, the description thereof is omitted, and only the processing step peculiar to the present embodiment will be described.

Figure 17:
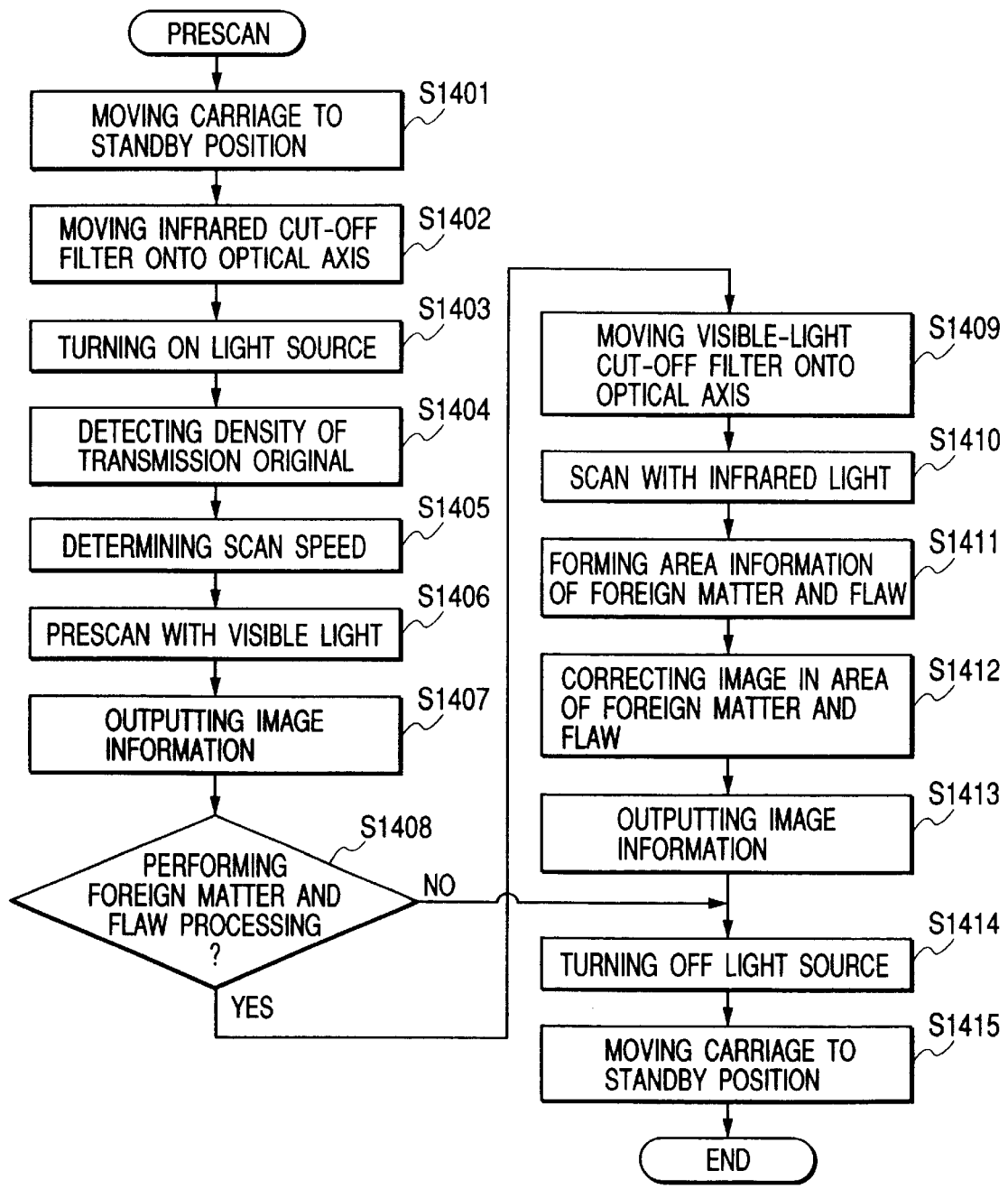
FIG. 17 shows a subroutine of the operation flow during prescan in the image reading apparatus according to a sixth embodiment of the present invention.

In FIG. 17, in step S1407, the image data obtained in step S1406 is outputted to the external equipment 18 via the interface 17 (image information output), and displayed on the monitor (display means), and the like disposed on the external equipment 18.

Moreover, in step S1410, the scan operation by the infrared light for detecting the foreign matter and flaw starts. In this case, similarly to the step S1406, when the prescan range is designated by the command from the external equipment 18, this is set to the image processing circuit 15 to perform the scan. Subsequently, the image data obtained by the scan is stored in the offset RAM 21. The processing of the subsequent steps S1411 to 1415 is the same as that of the steps S1112 to 1116 of FIG. 14.

The main scan sequence of the image reading apparatus S of the present embodiment will next be described with reference to FIG. 18. Since the main scan sequence shown in FIG. 18 is basically the same as the prescan sequence shown in FIG. 17, and the main scan is different only in that the selection width of the image taking resolution is enlarged, the detailed description is omitted.

Furthermore, since the ejecting sequence of the image reading apparatus S of the present embodiment is the same as that of FIG. 6 of the first embodiment, the description is omitted.

As described above, according to the image reading apparatus S of the present embodiment, the image obtained before the foreign matter and flaw correction is displayed on the monitor, the operator recognizes the image, and the image obtained after the foreign matter and flaw correction is then displayed on the monitor, so that the operator can easily confirm the foreign matter and flaw correction effect.

A seventh embodiment of the present invention will next be described with reference to FIGS. 19 and 20.

Additionally, since the system constitution provided with the image reading apparatus of the present embodiment is the same as that of FIG. 13 of the fourth embodiment, and the through-view state of the internal constitution of the image reading apparatus of the present embodiment is the same as that of FIG. 2 of the first embodiment, the description will be performed with reference to these drawings. Moreover, since the main flow of the image reading apparatus of the present embodiment is the same as that of FIG. 3 of the first embodiment, the description thereof is omitted.

The main scan sequence of the image reading apparatus S of the present embodiment will be described with reference to FIG. 19. FIG. 19 is different from FIG. 18 of the fifth embodiment in that the step S1507 is deleted from FIG. 18, and the scan image by the visible light and the scan image by the infrared light are simultaneously stored in the offset RAM 21 and then outputted to the external equipment 18 via the interface 17.

Therefore, the seventh embodiment is different from the fifth embodiment in that the visible-light and infrared-light image data are simultaneously outputted to the external equipment 18. In this method the capacity of the offset RAM 21 has to be large, but the simultaneous output produces the following advantages.

Figure 19:
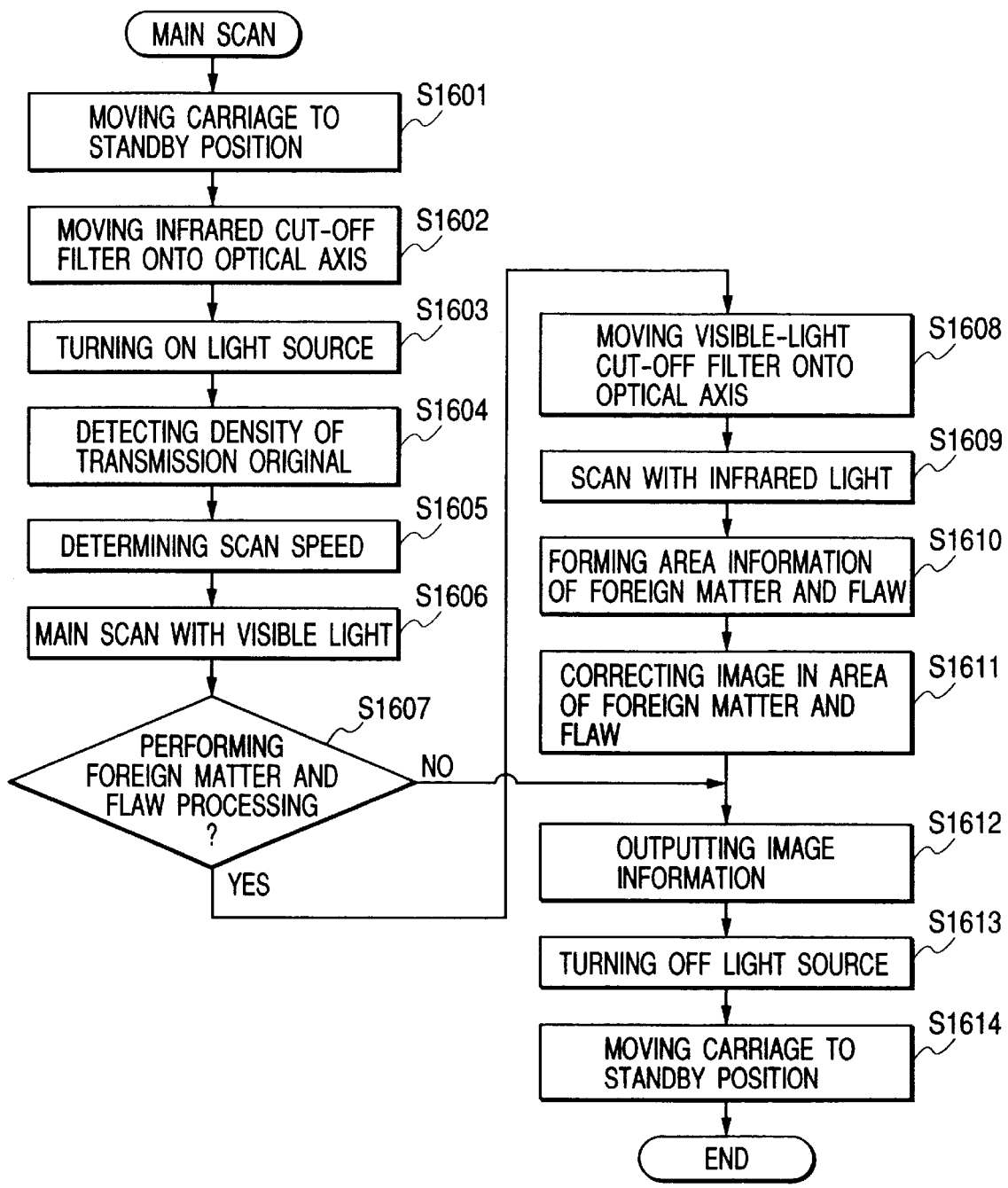
FIG. 19 shows a subroutine of the operation flow during main scan in the image reading apparatus according to a seventh embodiment of the present invention.

For example, when the foreign matter and flaw correction is performed in step S1611 of FIG. 19, and the corrected (modified) image is outputted in the next step S1612, for the foreign matter and flaw area image, the images obtained before and after the foreign matter and flaw correction is performed are outputted, and for the image other than the foreign matter and flaw area image, only the scan image by the visible light is outputted.

Figure 20D:
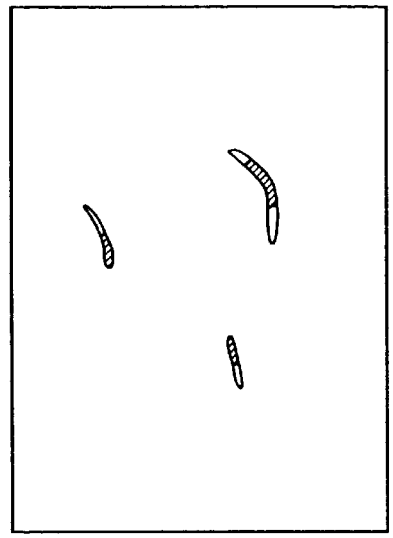
FIGS. 20A, 20B, 20C and 20D are diagrams showing output data to an external equipment in the image reading apparatus according to the seventh embodiment of the present invention.
Figure 20A:
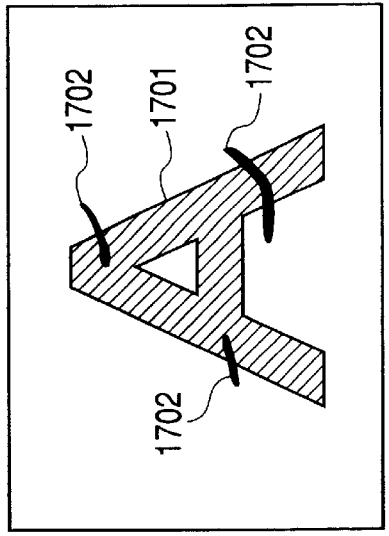
Figure 20C:
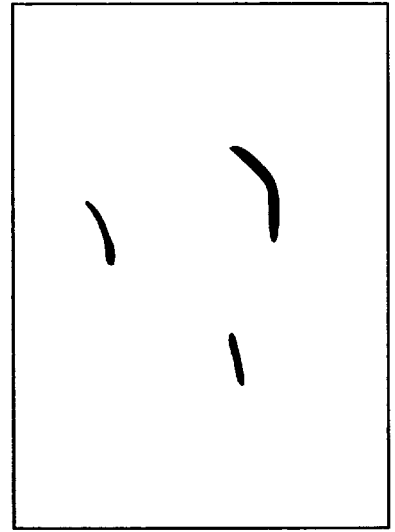
Figure 20B:
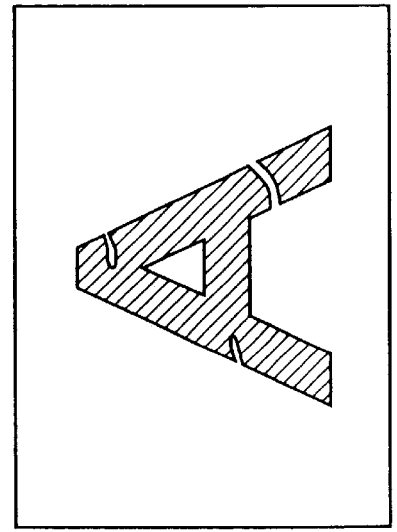

This state is shown in FIGS. 20A to 20D. FIG. 20A shows the scan image by the visible light, and foreign matters/flaws 1702 are laid on an image 1701 of the transmission original 2. In the step S1612 of FIG. 19 this image data is divided into the visible-light image other than the foreign matter and flaw area image shown in FIG. 20B, the visible-light image of the foreign matter and flaw area shown in FIG. 20C, and the corrected (modified) image of the foreign matter and flaw area shown in FIG. 20D, and outputted to the external equipment 18.

Usually, since the foreign matter and flaw area has a very small area with respect to the entire transmission original 2, by this step, the image data to be outputted to the external equipment 18 is not of two frames, and substantially one frame of image data is outputted. Therefore, the transfer data amount is remarkably reduced and the transfer time is also reduced.

Furthermore, when the image data transferred in this manner is synthesized in the software (application) of the external equipment 18, the images obtained before and after the foreign matter and flaw correction can successively be displayed on the monitor.

Figure 18:
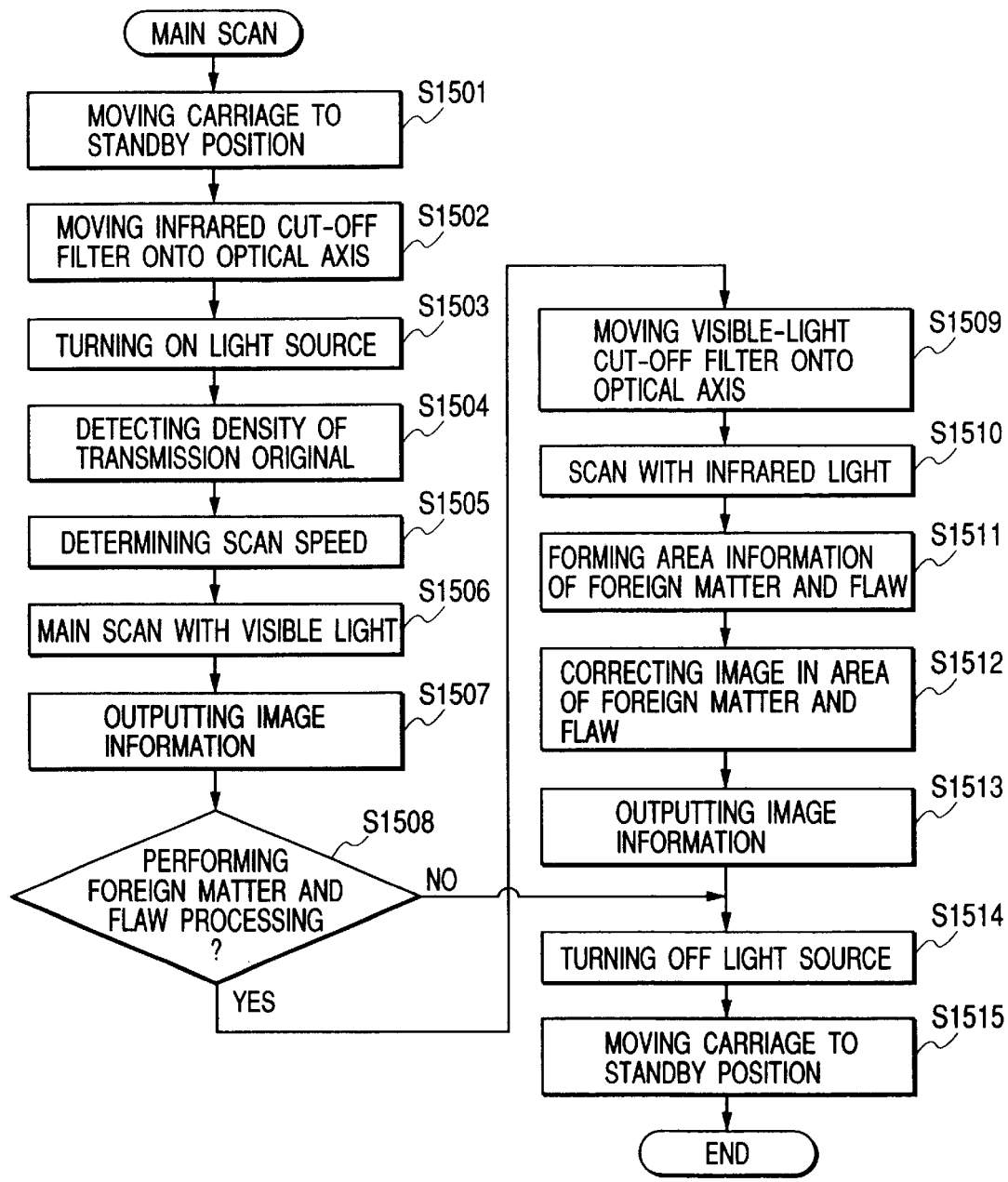
FIG. 18 shows a subroutine of the operation flow during main scan in the image reading apparatus according to the sixth embodiment of the present invention.

Additionally, since the other step processings in FIG. 19 are the same as those of FIG. 18, the description thereof is omitted.

An eighth embodiment of the present invention will next be described with reference to FIG. 21.

Additionally, since the system constitution provided with the image reading apparatus of the present embodiment is the same as that of FIG. 13 of the fourth embodiment, and the through-view state of the internal constitution of the image reading apparatus of the present embodiment is the same as that of FIG. 2 of the first embodiment, the description will be performed with reference to these drawings. Moreover, since the main flow of the image reading apparatus of the present embodiment is the same as that of FIG. 3 of the first embodiment, the description thereof is omitted. Furthermore, since the main scan sequence of the image reading apparatus of the present embodiment is basically the same as that of FIG. 18 of the sixth embodiment, the description will be performed with reference to the drawing.

In the present embodiment, a method of displaying the images before and after the foreign matter and flaw correction on the monitor attached to the external equipment 18 will be described. The constitution and flow for processing the image and outputting the image to the external equipment 18 so that the images obtained before and after the foreign matter and flaw correction are displayed on the monitor attached to the external equipment 18 are the same as those of the sixth and seventh embodiments.

Figure 21A:
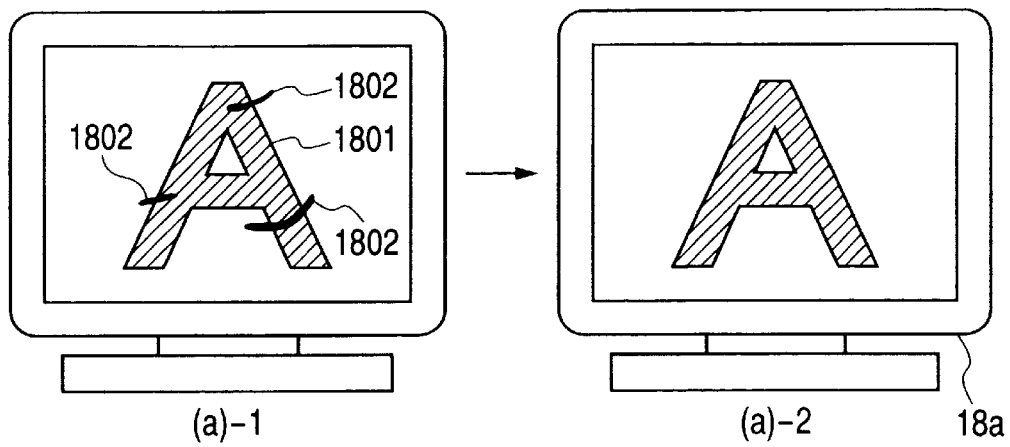
FIGS. 21A, 21B and 21C are diagrams showing that images before and after foreign matter/flaw correction are displayed on a monitor in the image reading apparatus according to an eighth embodiment of the present invention.
Figure 21B:
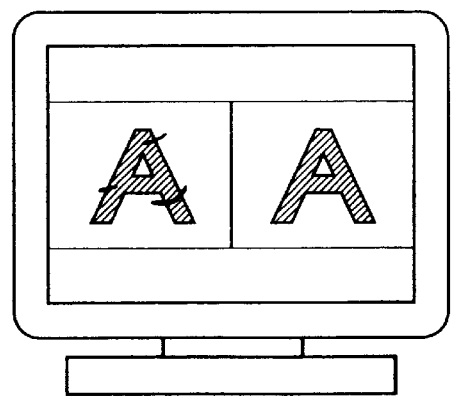
Figure 21C:
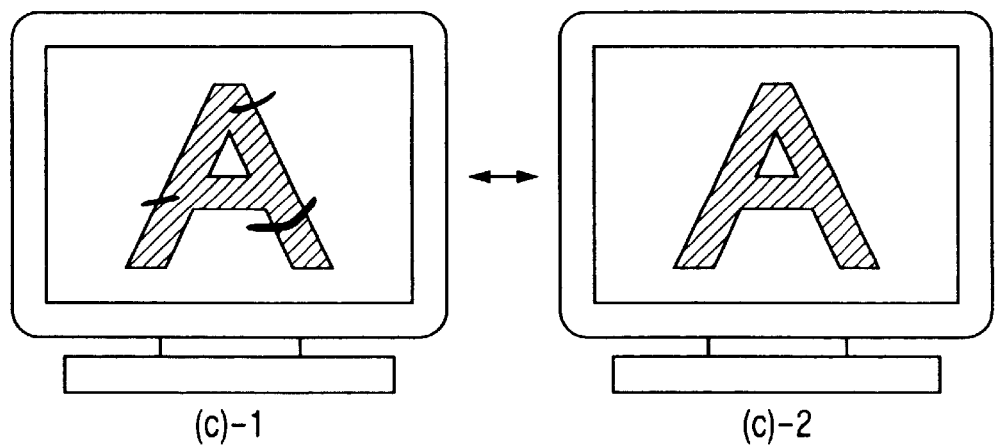

FIGS. 21A to 21C show that the images of the transmission original 2 are displayed on a monitor (display means) 18a disposed on the external equipment 18.

First, for example, FIG. 21A shows that the visible-light image outputted in the step S1507 of FIG. 18 is inputted to the external equipment 18 and immediately displayed on the monitor 18a. Therefore, an image 1801 of the transmission original 2 and foreign matters/flaws 1802 are also displayed on the monitor 18a ((a)-1). Subsequently, while the processing in and after the step S1509 of FIG. 18 is performed, the image is displayed on the monitor 18a. Subsequently, when the image obtained by correcting the foreign matter and flaw is inputted to the external equipment 18 in the step S1513 of FIG. 18, the corrected image is also displayed on the monitor 18a ((a)-2).

Thereby, the operator can recognize the foreign matter and flaw correction state.

Moreover, FIG. 21B shows that the images before and after the foreign matter and flaw correction are displayed on the monitor 18a in a divided manner. In FIG. 21B, the image before the foreign matter and flaw correction is displayed on the left side, and the image after the foreign matter and flaw correction is displayed on the right side. Referring to the fifth embodiment, the image inputted in the step S1507 of FIG. 18 is first displayed on the left side, while the right-side screen is blacked out indicating that the processing is being performed. Subsequently, when the image after the foreign matter and flaw correction is inputted in the step S1513 of FIG. 18, the image is displayed on the right side. Thereby, the operator can simultaneously recognize the images obtained before and after the foreign matter and flaw correction, and can easily compare the images with each other.

Furthermore, when in FIG. 21C the image ((c)-1) obtained before the foreign matter and flaw correction and the image obtained after the foreign matter and flaw correction ((c)-2) are instructed by the operator via an input apparatus (not shown) attached to the external equipment 18, the respective image displays can be switched. Thereby, the operator can simultaneously recognize the images obtained before and after the foreign matter and flaw correction, and can easily compare the images with each other.

As described above, the operator can easily recognize and compare the effect of the foreign matter and flaw correction, but when the images obtained before and after the foreign matter and flaw correction can selectively be recorded on the hard disk of the external equipment 18, the following cases can immediately be handled: a case in which the result of the foreign matter and flaw correction is undesirably and the image is to be recorded without performing the foreign matter and flaw correction; and a case in which the image obtained by correcting the foreign matter and flaw is to be recorded as it is.

According to the image reading apparatus of the respective embodiments described above in detail, since the difference of the image forming magnification between the visible-light image and the infrared-light image is corrected, it is effectively possible to exactly grasp the area which requires the foreign matter and flaw correction.

Moreover, since the correction requiring area is determined by performing in advance, the focus adjustment during the scan with the visible light, offsetting (changing) the optical path length from the focus position of the visible-light scan during the scan with the infrared light, and further correcting the deviation of the correction requiring area by the magnification change, it is effectively possible to exactly grasp the area for which the correction is required by the foreign matter and flaw.

Furthermore, since the scan resolution by the visible light is allowed to differ from the scan resolution by the infrared light, there is produced an effect that the foreign matter and flaw correction can exactly be performed without complicating the circuit constitution or increasing the memory capacity and processing time.

Additionally, since the images obtained before and after the foreign matter and flaw on the transmission original are corrected can be displayed, the operator can easily compare and recognize the effect of the foreign matter and flaw correction, and there is further provided an effect that the finally obtained image can easily be selected from the images obtained before and after the foreign matter and flaw correction is performed.

Figure 22A:
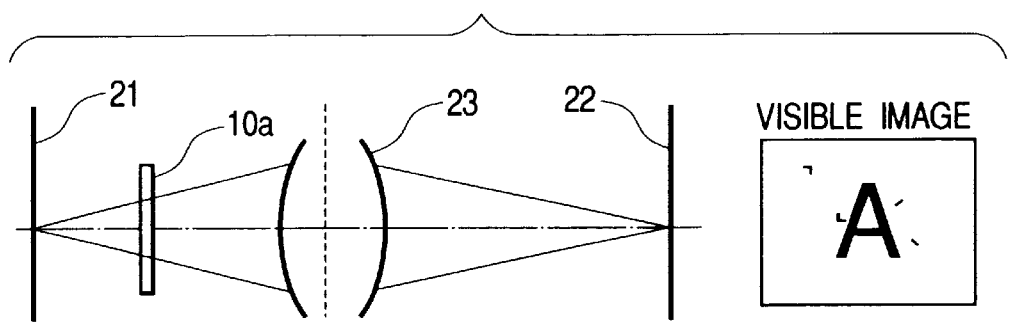
FIGS. 22A and 22B are schematic views showing a ninth embodiment.
Figure 22B:
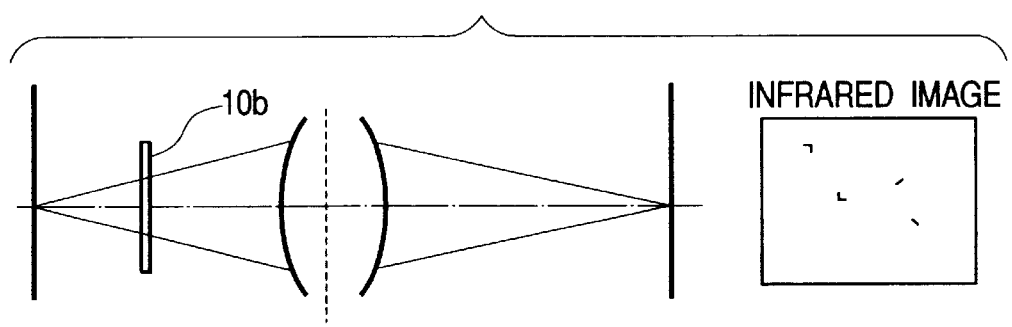
Figure 23:
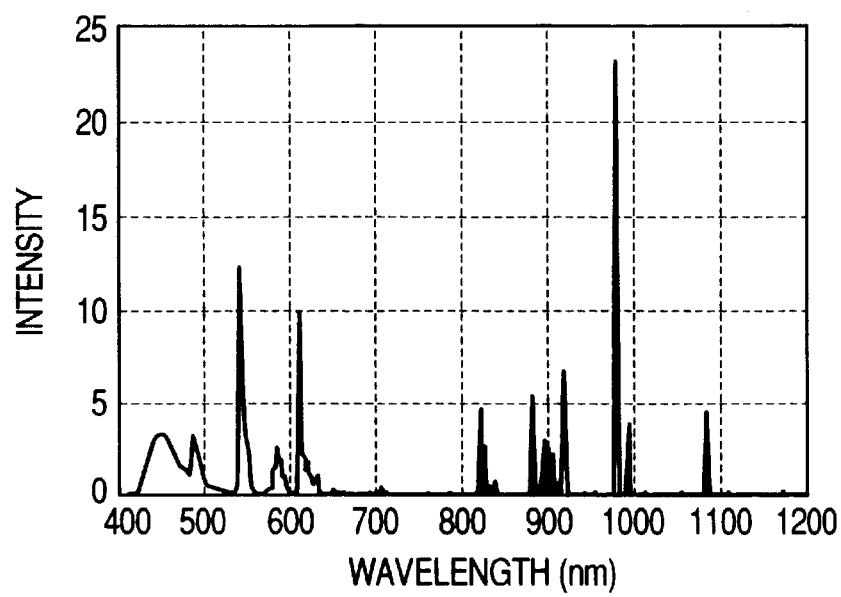
FIG. 23 is a graph showing the spectral distribution of a light source.
Figure 24:
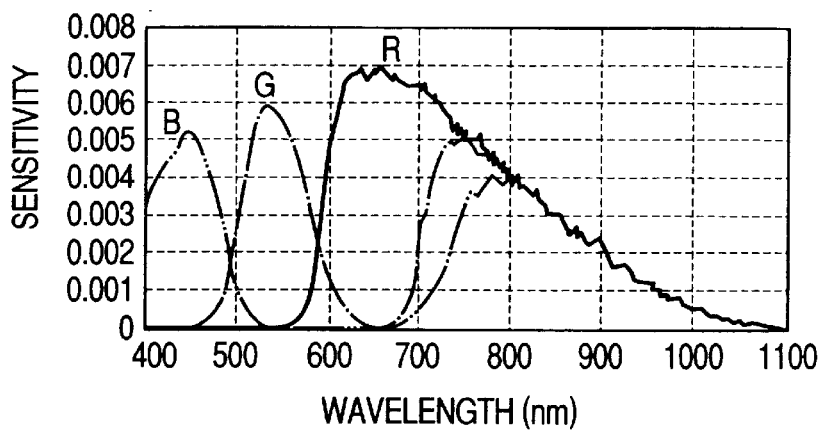
FIG. 24 is a graph showing the spectral sensitivity of a line sensor.
Figure 25:
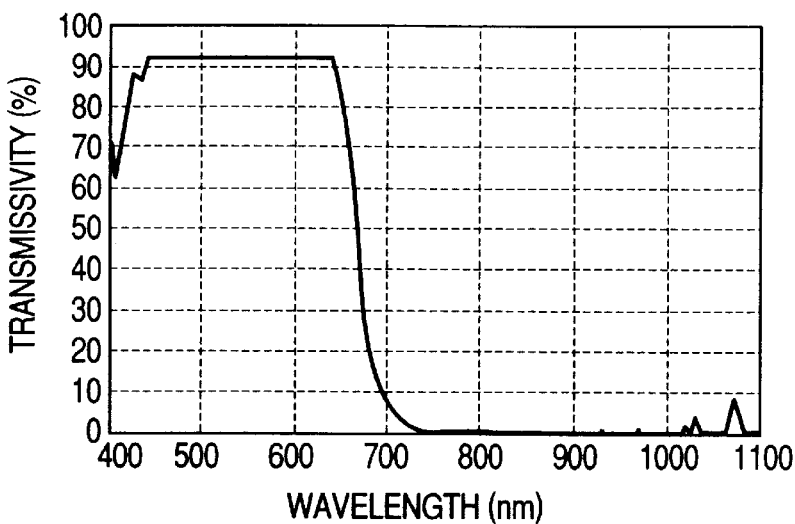
FIG. 25 is a graph showing the spectral characteristic of a visible-light reading filter.
Figure 26:
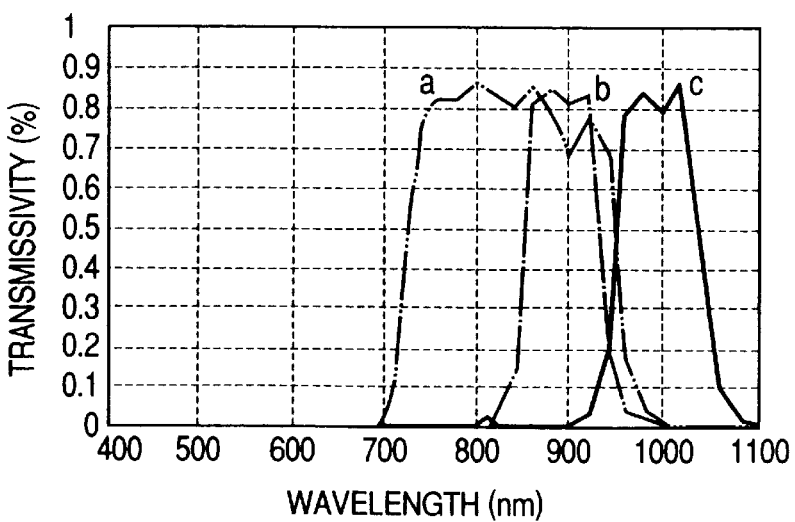
FIG. 26 is a graph showing the spectral characteristic of an infrared-light reading filter.
Figure 27:
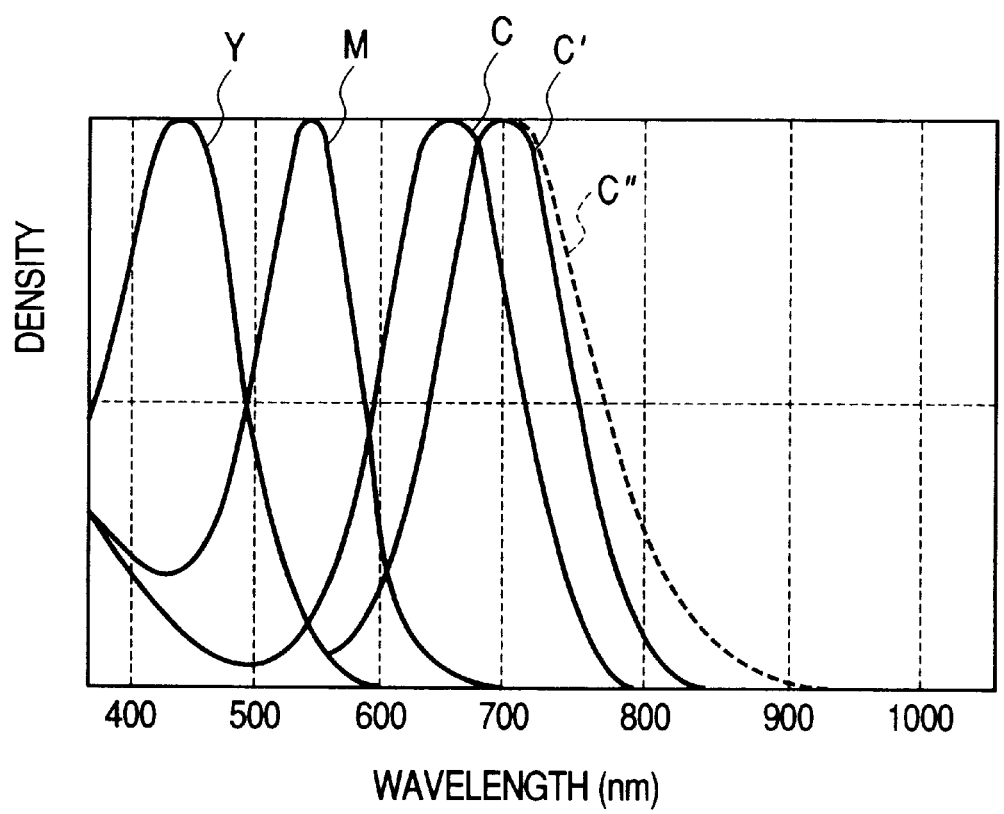
FIG. 27 is a graph showing the spectral density characteristic of an original.
Figure 28:
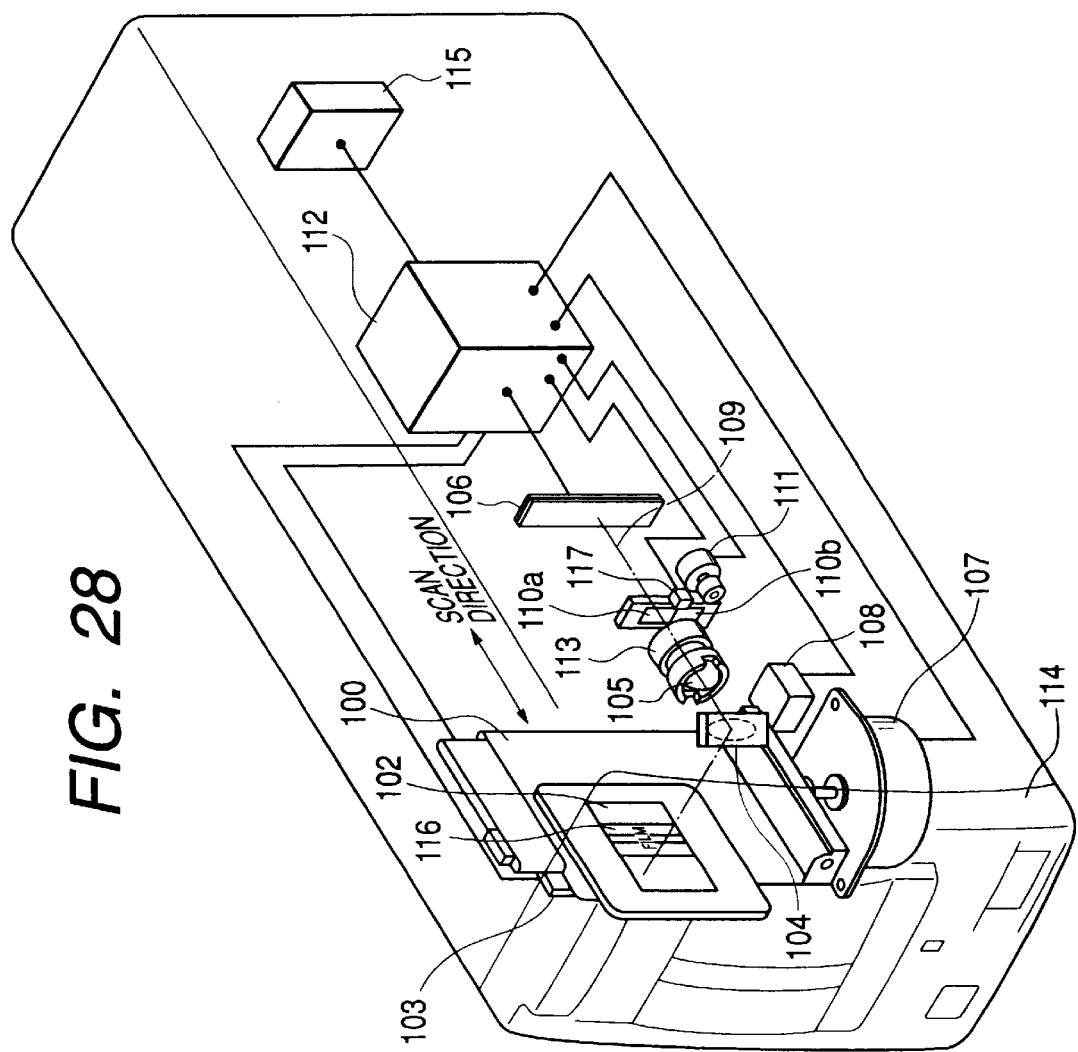
FIG. 28 is a perspective view showing the main part of a film scanner.
Figure 29:
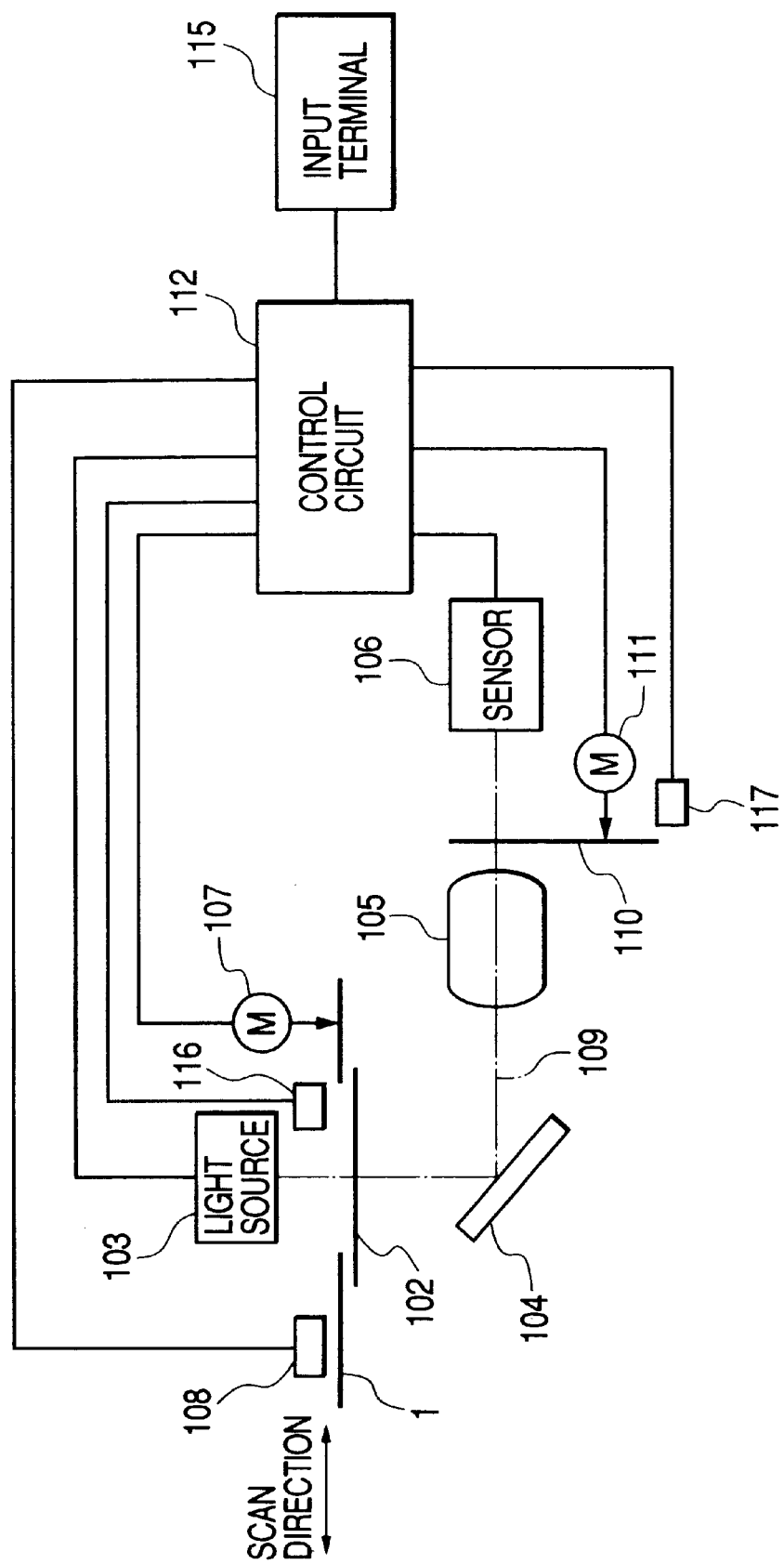
FIG. 29 is a schematic view of the film scanner.
Figure 30:
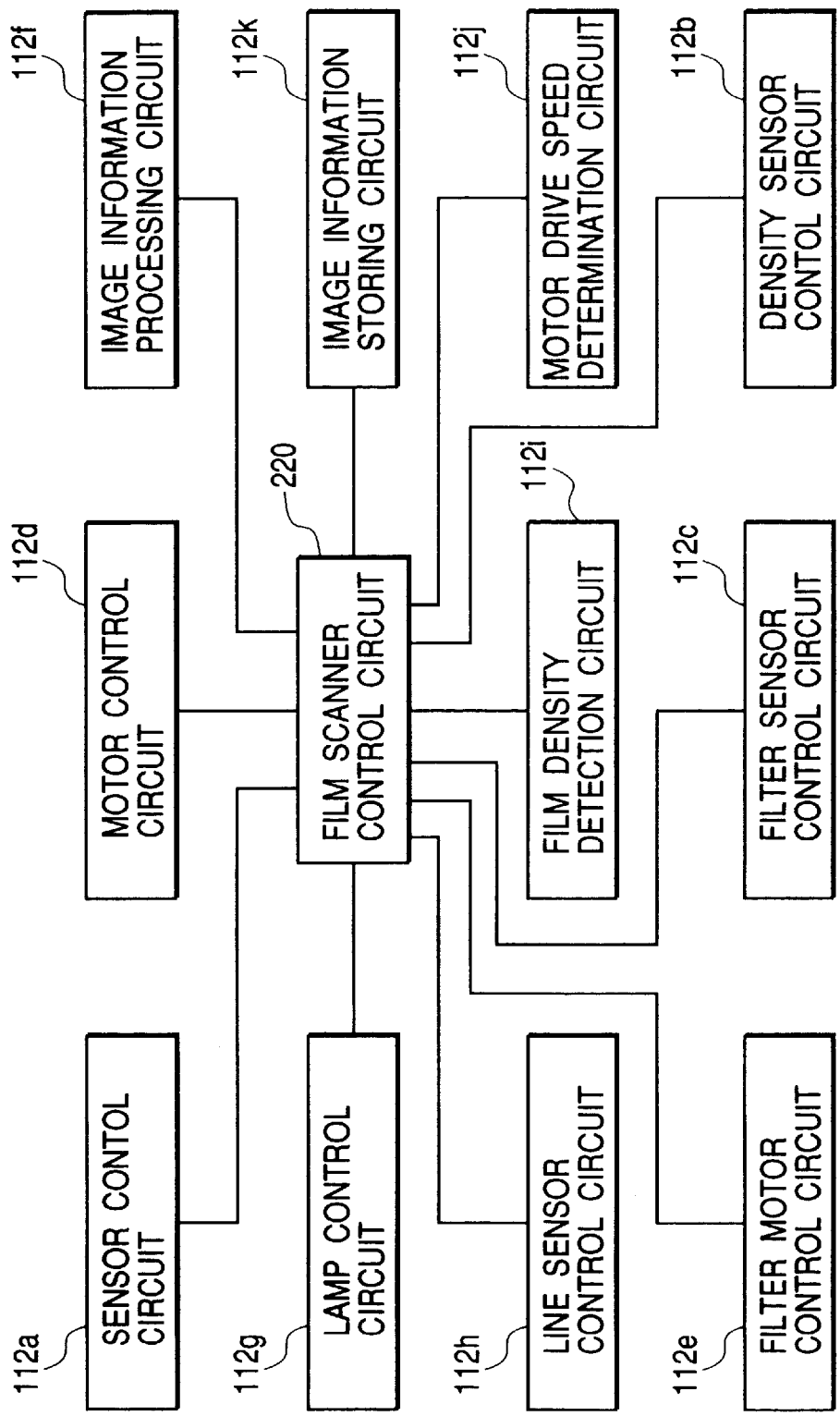
FIG. 30 is a block diagram showing the circuit constitution of the film scanner.

FIGS. 22 to 31 are explanatory views of a "film scanner" according to a ninth embodiment, FIG. 22 is a schematic view of the ninth embodiment, FIG. 23 is a graph showing the spectral distribution of the light source, FIG. 24 is a graph showing the spectral sensitivity of the line sensor, FIG. 25 is a graph showing the spectral characteristic of a visible light reading filter, FIG. 26 is a graph showing the spectral characteristic of an infrared light reading filter, FIG. 27 is a graph showing the spectral density characteristic of the original, FIG. 28 is a perspective view showing the main part of the film scanner, FIG. 29 is a schematic view of the film scanner, FIG. 30 is a block diagram showing the circuit constitution of the film scanner, and FIG. 31 is a flowchart showing the operation of the film scanner.

In the drawings, numeral 101 denotes a film carriage, 102 denotes a film, 103 denotes a lamp (light source), 104 denotes a mirror, 105 denotes an image forming lens, 106 denotes a line sensor, 107 denotes a motor, 108 denotes a sensor, 109 denotes an optical axis, 110 denotes a filter, 110a denotes a visible light reading filter, 100b denotes an infrared light reading filter, 111 denotes a filter motor, 112 denotes a control circuit, 113 denotes a lens holder, 114 denotes a film scanner outer covering, 115 denotes an input terminal of image information, 116 denotes a film density detection sensor, 117 denotes a filter sensor, 121 denotes a film (object) plane, 122 denotes an image plane, and 123 denotes an image forming lens.

In the present embodiment, when the original image and original defect are read, the original is illuminated by the same light source provided with infrared-light and visible-light components. As shown in FIG. 22A, when the image is read from the originals such as a film, the visible light reading filter 110a which does not transmit any infrared light is inserted and the image is read. Moreover, when the original defects such as the foreign matter and flaw are read, as shown in FIG. 22B, the infrared light reading filter 110b which does not transmit any visible light is inserted, and the defect is read.

As one example of the light source, as shown in FIG. 23, a light source contains both visible-light and infrared-light components. Moreover, this light source is also provided with blue, green, red light components so that the color reading of the image can be realized.

Furthermore, as one example of the light receiving element of the image plane 122, as shown in FIG. 24, a CCD includes both visible-light and infrared-light sensitivities. Additionally, this CCD is also provided with blue, green, red (B, G, R) light sensitivity components so that the color reading of the image can be realized.

Moreover, as one example of the visible light reading filter 110a, as shown in FIG. 25, an infrared-light cut-off filter has a sufficient transmittance in a visible range, and transmits substantially no light in an infrared range. Furthermore, this filter is also provided with a sufficient transmittance to blue, green, red light so that the color reading of the image can be realized.

In the apparatus of the present embodiment, in order to correct the aberration on the image plane 122 generated by the difference of the visible light and infrared light wavelengths between the case in which the original image is read by the visible light and the case in which the defects such as the foreign matter and flaw on the original are read by the infrared light, the filters having different thickness values are inserted in the respective cases and the images are read. Since the image forming point by the infrared light is actually present far from the image plane by the visible light, in order to correct the difference of the image forming points, a thicker filter than the filter for the infrared light reading is inserted during the visible light reading to correct the image forming point. Therefore, in the case of visible reading and infrared reading, the respective images provided with appropriate image forming performances (MTF) can be read.

Moreover, the present embodiment is characterized by the infrared light reading filter 110b shown by a of FIG. 26. This infrared-light filter has substantially no transmittance in the visible range, and a high transmittance distribution between 800 nm and 850 nm of the infrared range. Therefore, the reading can be performed by the wavelength area which is relatively high in CCD sensitivity, and the original defect reading can be performed with a high image quality.

Moreover, in FIG. 22, the visible-light filter and infrared-light filter are disposed between the film (original) plane 121 and the lens 123, but they may be disposed between the image plane 122 and the lens 123.

Furthermore, in the present embodiment, when the original image is read by the visible light, and the original defect is read by the infrared light, the respective images provided with the appropriate image forming performances (MTF) can be read, but the magnifications do not agree with each other in the respective cases. In this respect, as described above in the embodiments, when the original defect is read by the infrared light, the error of the magnification to the case of reading the original image by the visible light can easily be corrected in advance by the signal processing system.

Additionally, the density of the filter as the original usually has a spectral distribution as shown in FIG. 27. In FIG. 27, Y, M show the densities of yellow, magenta of the films corresponding to blue, green, and C, C', C" show the densities of cyan of a positive film corresponding to red, cyan of an ordinary negative film, and cyan of some special negative films. In the present embodiment, the defects of the original such as the foreign matter and flaw are read by the luminous flux with an infrared wavelength of 800 nm to 850 nm. Therefore, when the infrared reading is read in the films of the density distributions such as C', C", the image of cyan density (red) is laid on the infrared image. In this case, the read image can be subtracted, so that the foreign matter and flaw detection can be performed in a satisfactory state.

The actual apparatus operation will be described hereinafter.

In the drawings, the developed film 102 is fixed onto the film carriage 101 which is used as an original base. Moreover, the light from the lamp 103 is transmitted through the film 102, reflected by the mirror 104 and formed into an image on the line sensor 106 by the lens 105. Moreover, the film carriage 101 moves in the scan (sub-scan) direction by the motor 107. The motor 111 is driven to switch between the visible light reading filter 110a and the infrared light reading filter 10b.

Moreover, the lamp 103, line sensor 106, motor 107, sensor 108, filter motor 111, and input terminal 115 are electrically connected to the control circuit 112. Furthermore, as shown in FIG. 30, the control circuit 112 is constituted of a sensor control circuit 112a, density sensor control circuit 112b, filter sensor control circuit 112c, motor control circuit 112d, filter motor control circuit 112e, image information processing circuit 112f, lamp control circuit 112g, line sensor control circuit 112h, film density detection circuit 112i, motor drive speed determination circuit 112j, image information storing circuit 112k and film scanner control circuit 220.

A method of reading the image information of the film 102 will next be described with reference to the flowchart of FIG. 31.

Step S1: When a film reading command is inputted from the outside via the input/output terminal 115, the position of the film carriage 101 is detected by the sensor 108 and sensor control circuit 112a, and the information is transmitted to the film scanner control circuit 220. Subsequently, in order to place the film carriage 1 in the predetermined standby position, the motor 107 is driven by the motor control circuit 112d, and the film carriage 101 is moved to the standby position.

Step S2: The position of the filter 110 is detected by the filter sensor 117 and filter sensor control circuit 112c, and the information is transmitted to the film scanner control circuit 120. Subsequently, in order to place the visible light reading filter 110a onto the optical axis 109 the filter motor 111 is driven by the filter motor control circuit 112e, and the visible light reading filter (infrared cut-off filter) 110a is moved onto the optical axis.

Step S3: The density of the film 102 is detected by the density sensor 116 and film density detection circuit 112i.

Step S4: The motor drive speed is determined based on the density information.

Step S5: The position of the filter 110a is detected by the filter sensor 117 and the filter sensor control circuit 112c, and the information is transmitted to the film scanner control circuit 220. Subsequently, in order to place the infrared light reading filter 110b onto the optical axis 109, the filter motor 111 is driven by the filter motor control circuit 112e, and the infrared light reading filter 110b is moved onto the optical axis 109.

Step S6: The lamp 103 is turned on by the lamp control circuit 112g.

Step S7: The motor 107 is rotated in the predetermined direction by the motor control circuit 112d at the determined drive speed, and the scan operation is performed to obtain the image information of the film 102 by the infrared light. During the scan the image information is transmitted to the image is information processing circuit 112f from the line sensor 106 via the line sensor control circuit 112h.

Step S8: The area on the film which is different in the infrared-light transmittance from the other most area on the film 102 by a predetermined value or more is detected from the obtained image signal, and the foreign matter and flaw range information is formed in the area.

Step S9: The position of the filter 110 is detected by the filter sensor 117 and filter sensor control circuit 112c, and the filter motor 111 is driven by the filter motor control circuit 112e to move the visible light reading filter 110a onto the optical axis 109.

Step S10: The motor 107 is rotated in a reverse direction by the motor control circuit 112d at the drive speed determined in the step S4 and the scan operation is performed to obtain the image information of the film 102 by the visible light. During the scan the image information is transmitted to the image information processing circuit 112f from the line sensor 106 via the line sensor control circuit 112h.

Step S11: After the scan operation ends, the lamp 103 is turned off by the lamp control circuit 112g, the foreign matter and flaw range information is transmitted to the image information processing circuit 112f from the image information storing circuit 112k, and the image information of the film 102 by the visible light is outputted, thereby ending the film image reading operation of the film scanner.

Step S12: The film image information by the visible light is corrected based on the foreign matter and flaw range information formed in the step S8, and outputted via the output terminal 115.

Moreover, the scan operation for obtaining the image information of the film 102 with the visible light may be performed prior to the scan operation for obtaining the image information of the film 102 with the infrared light. In this case, however, the image information of the film 102 by the visible light is stored in the image information storing circuit.

According to the present embodiment, by disposing the light source including both the infrared light and visible light as the lighting light source, and switching the infrared light and visible light by the inserted filter, the lighting system is miniaturized and simplified, and a compactor and lower-cost apparatus can be provided.

Moreover, by inserting the filters different in thickness when the original image is read by the visible light and when the original defects such as the foreign matter and flaw are read by the infrared light, the satisfactory image forming performance is secured, the correction of these defects appearing on the original image can more exactly be performed, and there can be provided an apparatus in which the reading can be performed with good image quality.

For a tenth embodiment, in the ninth embodiment, instead of the infrared-light filter with the spectral characteristic shown by a of FIG. 26, the infrared-light filter with the spectral characteristic shown by b of FIG. 26 is used. This infrared-light filter has substantially no transmittance in the visible range, and has a high transmittance distribution between infrared 850 nm and 950 nm. Therefore, even when the original defects such as the foreign matter and flaw are read by the infrared light with respect to the ordinary negative film shown by C' of FIG. 27, the reading can be performed without laying the image of the cyan density (red) on the infrared image. This can realize the foreign matter and flaw detection in the satisfactory state.

For an eleventh embodiment, instead of the infrared-light filter with the spectral characteristic shown by a of FIG. 26 of the ninth embodiment, the infrared-light filter with the spectral characteristic shown by c of FIG. 26 is used. This infrared-light filter has substantially no transmittance in the visible range, and has a high transmittance distribution in a wavelength longer than infrared 950 nm. Therefore, even when the original defects such as the foreign matter and flaw are read by the infrared light with respect to the special negative film shown by C" of FIG. 27, the reading can be performed without laying the image of the cyan density (red) on the infrared image. This can realize the foreign matter and flaw detection in the satisfactory state even with respect to some special negative films.

Figure 32A:
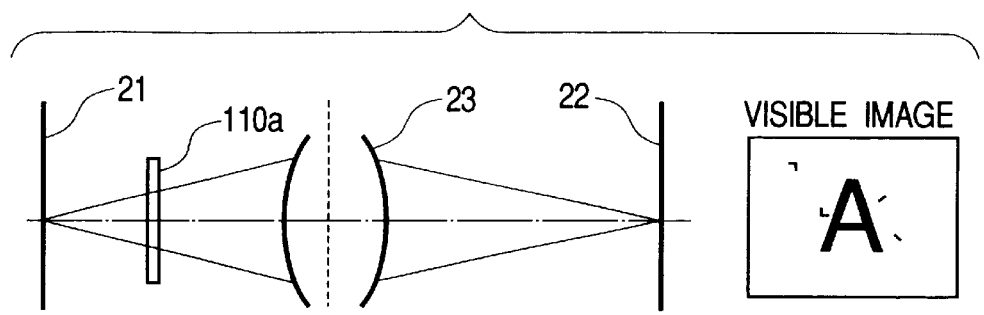
FIGS. 32A and 32B are diagrams schematically showing a twelfth embodiment.
Figure 32B:
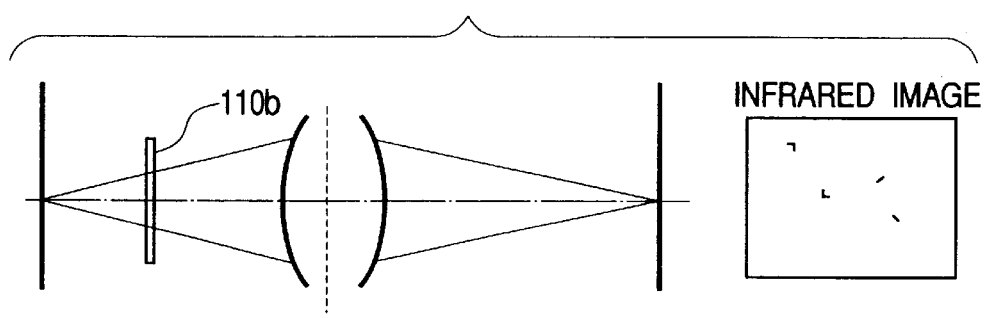

In a twelfth embodiment, in order to the magnification error in the image plane 132 generated by the difference of the visible-light and infrared-light wavelengths between the case in which the original image is read by the visible light and the case in which the original defects such as the foreign matter and flaw are read by the infrared light, as shown in FIGS. 32A and 32B, in the respective cases the appropriately thick filters 110a, 110b are inserted to read the image. Therefore, it is possible to read the image of the same magnification in the case of the visible light reading and infrared light reading.

Since the constitution and operation of the present embodiment are similar to those of the ninth embodiment except the above-described filters, they will be described with reference to FIGS. 23 to 31.

The present embodiment is characterized by the infrared-light filter with the spectral characteristic shown by a of FIG. 26. This infrared-light filter has substantially no transmittance in the visible range, and a high transmittance distribution between infrared 800 nm and 850 nm. Therefore, the reading can be performed by the wavelength area with a relatively high CCD sensitivity, and the original defects can be read with the good image quality.

In FIGS. 32A and 32B which schematically show the present embodiment, the visible-light filter and infrared-light filter are disposed between the film (original) plane 121 and the lens 123, but they may be disposed between the image plane 122 and the lens 123.

Moreover, like in the present embodiment, when the image forming magnification of the case of reading the original image by the visible light is substantially the same as that of the case of reading the original defect by the infrared light, the image forming performance (MTF) cannot be set to be satisfactory for both the cases. In this case, since the reading of the original defect by the infrared light does not require the resolution equal to that of the reading of the original image by the visible light, during the infrared-light reading, the image forming performance may be secured to such an extent that the reading of the original defect can be performed. Additionally, in the present embodiment, since the magnification error of the optical system is eliminated by the filters 110a, 110b as described above, different from the ninth embodiment, the signal processing for correcting the magnification error is unnecessary.

According to the present embodiment, by inserting the appropriately thick filter so that the magnification during the reading of the original image with the visible light becomes substantially the same as the magnification during the reading of the original defects such as the foreign matter and flaw with the infrared light, these defects appearing on the original image can more accurately be corrected, and there can be provided an apparatus which can perform the reading with good image quality.

Figure 33A:
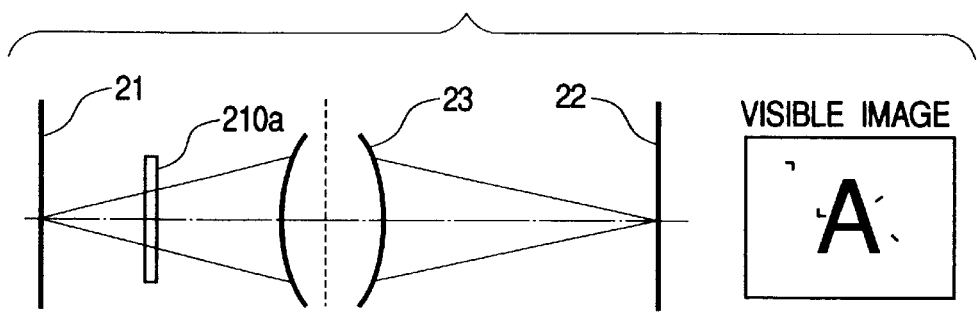
FIGS. 33A and 33B are diagrams schematically showing a thirteenth embodiment.
Figure 33B:
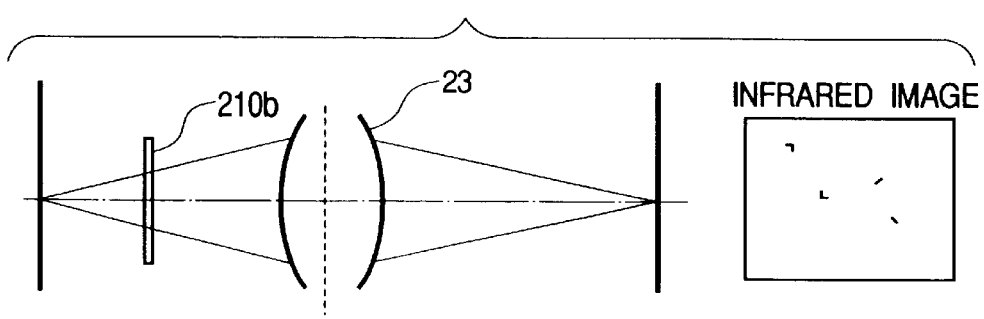
Figure 35A:
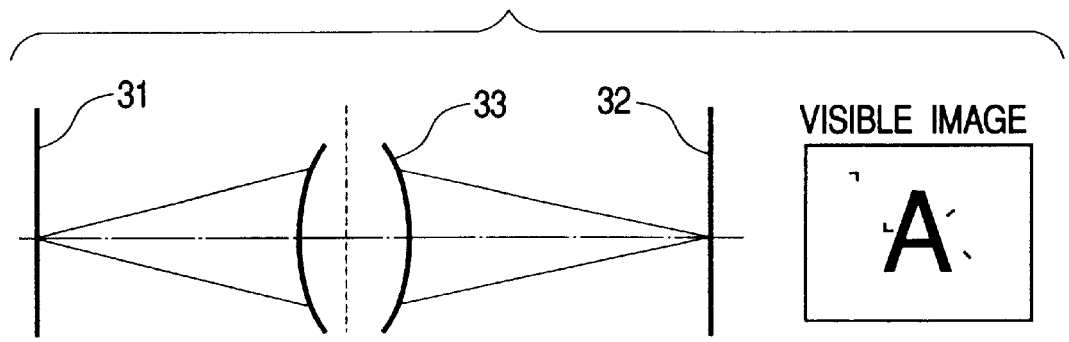
FIGS. 35A and 35B are explanatory views of a conventional example.
Figure 35B:
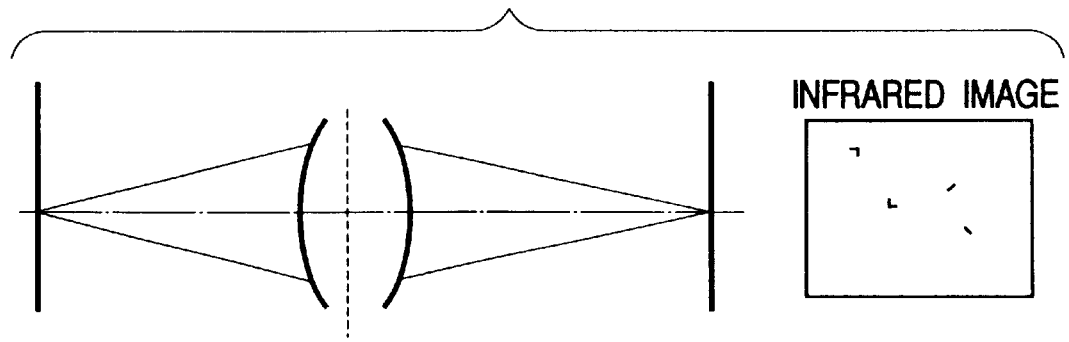

In a thirteenth embodiment, the image forming lens in the twelfth embodiment is further moved along the optical axis. Specifically, the original image is read by the visible light as shown in FIG. 33A, and the original defects such as the foreign matter and flaw are read with the infrared light as shown in FIG. 33B. In order to reduce the magnification error on the image plane 132 generated by the difference of the visible and infrared light wavelengths in the case of the reading of the original image with the visible light and the reading of the original defects such as the foreign matter and flaw with the infrared light, and to minimize the decrease of the image forming performance, the appropriately thick filters 210a, 210b are inserted so that the magnification becomes substantially the same in the respective cases, and lens moving means (not shown) for moving the image forming lens 123 along the optical axis is disposed.

With this structure, the reading can be realized with the same magnification and with the high image forming performance (MTF) during the reading of the original image with the visible light and during the reading of the original defects such as the foreign matter and flaw with the infrared light, the foreign matter and flaw detection can be performed in the satisfactory state.

For a fourteenth embodiment, in the twelfth or thirteenth embodiment, instead of the infrared-light filter with the spectral characteristic shown by a of FIG. 26, the infrared-light filter with the spectral characteristic shown by b of FIG. 26 is used. This infrared-light filter has substantially no transmittance in the visible range, and has a high transmittance distribution between infrared 850 nm and 950 nm. Based on this, even when the original defects such as the foreign matter and flaw are read by the infrared light with respect to the ordinary negative film shown by C' of FIG. 27, the reading can be performed without laying the image of the cyan density (red) on the infrared image. This can realize the foreign matter and flaw detection in the satisfactory state.

For a fifteenth embodiment, in the twelfth or thirteenth embodiment, instead of the infrared-light filter with the spectral characteristic shown by a of FIG. 26, the infrared-light filter with the spectral characteristic shown by c of FIG. 26 is used. This infrared-light filter has substantially no transmittance in the visible range, and has a high transmittance distribution in a wavelength longer than infrared 950 nm. Based on this, even when the original defects such as the foreign matter and flaw are read with the infrared light with respect to the special negative film shown by C" of FIG. 27, the reading can be performed without laying the image of the cyan density (red) on the infrared image. This can realize the foreign matter and flaw detection in the satisfactory state even with respect to some special negative films.

According to the above-described constitutions, the apparatus can be miniaturized and simplified, and the defects such as the foreign matter and flaw on the original can adequately be corrected.

Many widely different embodiments of the present invention may be constructed without departing from the spirit and scope of the present invention. It should be understood that the present invention is not limited to the specific embodiments described in the specification, except as defined in the appended claims.

What is claimed is:

1. A memory medium which stores a control program to control an image reading apparatus for illuminating a transmission original with visible light and infrared light and reading an image on the transmission original by reading means and which is readable by information reading means, said control program comprising: an infrared-light image extraction module for focusing by a visible-light image and subsequently changing an optical path length to extract an infrared-light image; and an area determination module for correcting an image magnification change caused during the extraction of said infrared-light image and determining a correction requiring area.

2. The memory medium according to claim 1 wherein said control program comprises a selection module for selecting whether or not to change said optical path length in accordance with a reading resolution of said reading means.

3. The memory medium according to claim 1 wherein said transmission original is a developed photograph film.

4. A memory medium which stores a control program to control an image reading apparatus for illuminating a transmission original with visible light and infrared light and reading an image on the transmission original by reading means and which is readable by information reading means, said control program comprising: a light emission module for emitting the visible light and the infrared light to illuminate the transmission original; an optical path length change module for changing an optical path length of an optical system for forming the light transmitted through said transmission original into an image; a focusing module for using said optical path length change module to perform a focusing operation; a light detection module for detecting the light transmitted through said optical system; a storing module for storing a light detection result by said light detection module; a calculation module for comparing and calculating contents stored by said storing module; a judgment module for judging from the light detection result by said light detection module whether an area requires correction or not; and a correction module for correcting image data in said correction requiring area, wherein when said transmission original is illuminated with said visible light, a focused state is obtained by said focusing module, and when said transmission original is illuminated with said infrared light, the optical path length is changed only by a predetermined amount predetermined by said optical path length change module, from said focused state.

5. The memory medium according to claim 4 wherein said control program comprises an area determination module for correcting an image magnification change by said optical path length change to determine said correction requiring area.

6. The memory medium according to claim 5 wherein said area determination module multiplies the light detection result by said infrared light by a factor attributed to said image magnification change to change image information, and determines said correction requiring area.

7. The memory medium according to claim 5 wherein said area determination module converts said correction requiring area determined by the light detection result by said infrared light into position information, multiplies the position information by a factor attributed to said image magnification change to correct said correction requiring area, and determines said correction requiring area.

8. The memory medium according to claim 4 wherein said control program further comprises a selection module for selecting whether or not to change said optical path length in accordance with a reading resolution of said reading means.

9. The memory medium according to claim 4 wherein said transmission original is a developed photograph film.

10. An image reading method comprising:
reading an image of an object illuminated with light of a first wavelength range;
reading an image of an object illuminated with light of a second wavelength range different from the first wavelength range; and
correcting a difference between the images of the object, caused by a difference in an image formation position resulted in from that the light of the first wavelength range and the light of the second wavelength range enter through an optical system to form the respective image of the object.

11. The image reading method according to claim 10, wherein the difference between the images of the object is corrected by subjecting an image signal obtained by reading the image of the object to a predetermined signal processing.

12. The image reading method according to claim 10, further comprising changing an optical path length from an object to a reading unit between when the image of the object is read with illuminating of the light of the first wavelength range and when the image of the object is read with illuminating of the light of the second wavelength range.

13. The image reading method according to claim 12, wherein the second wavelength range includes more non-visible light component than the first wavelength range.

14. The image reading method according to claim 12, wherein the optical path length is changed according to a reading resolution.

15. The image reading method according to claim 14, further comprising selecting whether or not to change said optical path length in accordance with a reading resolution.

16. The image reading method according to claim 12, wherein the optical path length is changed by a predetermined amount.

17. The image reading method according to claim 16, wherein the optical path length is changed to correct a change of an image magnification.

18. The image reading method according to claim 16, wherein image information is changed by multiplying a signal obtained when the image of the object illuminated with the light of the second wavelength range is read, by a coefficient corresponding to the change of the image magnification.

19. The image reading method according to claim 17, wherein a first area of the image of the object illuminated with the light of the second wavelength range is converted into position information, and said first area is corrected by multiplying the position information by the coefficient corresponding to the change of the image magnification.

20. The image reading method according to claim 10, wherein the second wavelength range includes more non-visible light component than the first wavelength range, and wherein an image area to be corrected is determined based on a signal obtained when the image of the object illuminated with the light of the second wavelength range is read.

21. The image reading method according to claim 10, wherein the second wavelength range includes more non-visible light component than the first wavelength range, and wherein a reading resolution for reading the image of the object illuminated with the light of the first wavelength range is higher than a reading resolution for reading the image of the object illuminated with the light of the second wavelength range.

22. The image reading method according to claim 10, wherein the optical system includes a lens.

23. The image reading method according to claim 10, wherein the second wavelength range includes more non-visible light component than the first wavelength range, and wherein each of the images of the object illuminated with the lights of the first and second wavelength ranges is respectively stored, an image area to be corrected is determined based on the image of the object illuminated with the light of the second wavelength range, and the image of the object illuminated with the light of the first wavelength range is corrected according to the determination of the image area to be corrected.

24. The image reading method according to claim 10, wherein aberration of the optical system is corrected using a predetermined optical member.

25. The image reading method according to claim 10, wherein the difference between the images of the object is a difference in size of the image.

26. An image reading apparatus comprising:
a reading unit which reads an image of object illuminated with light of a first wavelength range and reads an image of the object illuminated with light of a second wavelength range different from the first wavelength range; and a correction unit which corrects a difference between the image of the object, caused be a difference in an image formation position resulted in from that the light of the first wavelength range and the light of the second wavelength range enter through an optical system to form the respective images of the object.

27. The image reading apparatus according to claim 26, wherein said correction unit corrects the difference between the images of the object by subjecting an image signal obtained by reading the image of the object to a predetermined signal processing.

28. The image reading apparatus according to claim 26, further comprising an optical path length changing unit which changes an optical path length from an object to said reading unit between when the image of the object is read with illuminating of the light of the first wavelength range and when the image of the object is read with illuminating of the light of the second wavelength range.

29. The image reading apparatus according to claim 28, wherein the second wavelength range includes more non-visible light component than the first wavelength range, wherein said optical path length changing unit changes the optical path length after focusing is attained based on the image of object illuminated with the light of the first wavelength range, and said reading unit reads after the change of the optical path length the image of the object illuminated with the light of the second wavelength range, and wherein said correction unit performs correction of the difference between the images of the object after the image of the object illuminated with the light of the first wavelength is read.

30. The image reading apparatus according to claim 29, wherein the optical path length is changed according to a reading resolution.

31. The image reading apparatus according to claim 28, wherein the optical path length is changed by a predetermined amount.

32. The image reading apparatus according to claim 30, further comprising a selection unit which selects whether or not to change said optical path length in accordance with a reading resolution.

33. The image reading apparatus according to claim 31, wherein the optical path length is changed to correct a change of an image magnification.

34. The image reading apparatus according to claim 32, wherein said correction unit changes image information by multiplying a signal obtained when the image of the object illuminated with the light of the second wavelength range is read, by a coefficient corresponding to the change of the image magnification.

35. The image reading apparatus according to claim 32, wherein said correction unit converts a first area of the image of the object illuminated with the light of the second wavelength range into position information, and corrects said first area by multiplying the position information by the coefficient corresponding to the change of the image magnification.

36. The image reading apparatus according to claim 26, wherein the second wavelength range includes more non-visible light component than the first wavelength range, and said apparatus further comprising a correction area determining unit which determines an image area to be corrected, based on a signal obtained when the image of the object illuminated with the light of the second wavelength range is read.

37. The image reading apparatus according to claim 26, wherein the second wavelength range includes more non-visible light component than the first wavelength range, and wherein a reading resolution for reading the image of the object illuminated with the light of the first wavelength range is higher than a reading resolution for reading the image of the object illuminated with the light of the second wavelength range.

38. The image reading apparatus according to claim 26, wherein the optical system includes a lens.

39. The image reading apparatus according to claim 26, wherein the second wavelength range includes more non-visible light component than the first wavelength range, and said apparatus further comprising a storing unit which stores each of the images of the object illuminated with the lights of the first and second wavelength ranges respectively, and a concealment unit which determines an image area to be corrected, based on the image of the object illuminated with the light of the second wavelength range and conceals the image of the object illuminated with the light of the first wavelength range according to the determination of the image area to be corrected.

40. The image reading apparatus according to claim 26, wherein said correction unit includes a predetermined optical member.

41. The image reading apparatus according to claim 40, wherein said predetermined optical member is one of a first optical member to be arranged on an optical path of visible light when the object is illuminated with the visible light, and a second optical member to be arranged on the optical path of the visible light when the object is illuminated with non-visible light, and thickness of each of the first and second optical members are set so as to correct said difference between the images of the object.

42. The image reading apparatus according to claim 40, wherein the image of the object formed when the light of the first wavelength range enters through the optical system, and the image of the object formed when the light of the second wavelength range enters through the optical system, are different from each other in at least one of a size and a focal point.

43. The image reading apparatus according to claim 40, further comprising a moving unit which moves the optical system.

44. The image reading apparatus according to claim 40, wherein the optical member has higher transmittance distribution for at least one of light of wavelength of 800 to 850 nm, light of wavelength of 850 to 950 nm, and light of wavelength greater than 950 nm, than that of the other lights.

45. The image reading apparatus according to claim 40, further comprising a light source which is arranged so as to emit the light of the first wavelength range and the light of the second wavelength range.

46. The image reading apparatus according to claim 40, wherein the predetermined optical member includes a first optical member to be used when the object is illuminated with visible light, and a second optical member to be used when the object is illuminated with non-visible light, and thickness of the first optical member is different from that of the second optical member.

47. The image reading apparatus according to claim 26, wherein the difference between the images of the object is a difference in size of the image.

48. The storage medium according to claim 49, wherein the difference between the images of the object is a difference in size of the image.

49. A storage medium which stores a program for controlling an image reading apparatus, said program comprising:

reading an image of an object illustrated with light of a first wavelength range;

reading an image of the object illuminated with light of a second wavelength range different from the first wavelength range; and correcting a difference between the images of the object, caused by a difference in an image formation position resulted in from that the light of the first wavelength range and the light of the second wavelength range enter through an optical system to form the respective images of the object.

50. An image reading method comprising:

reading an image of an object illuminated with light of a first wavelength range;

reading an image of the object illuminated with light of a second wavelength range different from the first wavelength range; and changing a reading resolution between when the object is illuminated with the light of the first wavelength range and when the object is illuminated with the light of the second wavelength range.

51. The image reading method according to claim 50, wherein the second wavelength range includes more non-visible light component than the first wavelength range, and wherein the reading resolution when the object is illuminated with the light of the second wavelength range is set to be less than that when the object is illuminated with the light of the first wavelength range.

52. The image reading method according to claim 50, wherein the second wavelength range includes more non-visible light component that the first wavelength range, and wherein the reading resolution when the object is illuminated with the light of the second wavelength range is variably set according to the amount of the information to be read when the object is illuminated with the light of the first wavelength range.

53. The image reading method according to claim 50, wherein the reading resolution is changed according to a change of the amount of information to be read.

54. The image reading method according to claim 50, wherein the second wavelength range includes more non-visible light component than the first wavelength range, and wherein an area to be corrected is determined based on the image of the object illuminated with the non-visible light.

55. The image reading method according to claim 50, wherein each of the images of the object illuminated with the first and second wavelength ranges respectively is stored, an area to be corrected is determined based on the image of the object illuminated with the light of the second wavelength range, and the image of the object illuminated with the light of the first wavelength range is corrected according to the determination of the area to be corrected.

56. An image reading apparatus comprising:

a reading unit which reads an image of an object illuminated with light of a first wavelength range and reads an image of the object illuminated with light of a second wavelength range different from the first wavelength range; and a resolution setting unit which changes a reading resolution between when the object is illuminated with the light of the first wavelength range and when the object is illuminated with the light of the second wavelength range.

57. The image reading apparatus according to claim 56, wherein the second wavelength range includes more non-visible light component than the first wavelength range, and wherein said resolution setting unit sets the reading resolution when the object is illuminated with the light of the second wavelength range to be less than that when the object is illuminated with the light of the first wavelength range.

58. The image reading apparatus according to claim 56, wherein the second wavelength range includes more non-visible light component that the first wavelength range, and wherein said resolution setting unit sets variably the reading resolution when the object is illuminated with the light of the second wavelength range, according to the reading resolution when the object is illuminated with the light of the first wavelength range.

59. The image reading apparatus according to claim 56, wherein the reading resolution is changed according to a change of the amount of information to be read.

60. The image reading apparatus according to claim 56, wherein the second wavelength range includes more non-visible light component than the first wavelength range, and said apparatus further comprising an area determination unit which determines area to be corrected, based on the image of the object illuminated with the light of the second wavelength range.

61. The image reading apparatus according to claim 56, further comprising a correction area determining unit which stores each of the images of the object illuminated with the first and second wavelength ranges respectively, determines an area to be corrected, based on the image of the object illuminated with the light of the second wavelength range, and corrects the image of the object illuminated with the light of the first wavelength range, according to the determination of the area to be corrected.

62. An image reading method comprising:
setting a first mode for reading an image of an object illuminated with light of a first wavelength range and a second mode for reading each of images of the object illuminated respectively with the light of the first wavelength range and light of a second wavelength range different from the first wavelength range;
displaying a first image which is read when the object is illuminated with the light of the first wavelength range, in case of that the first mode is selected; and
in case of that the second mode is selected, correcting a second image which is read when the object is illuminated with the light of the first wavelength range, based on a third image which is read when the object is illuminated with the light of the second wavelength range, and displaying the second image prior to correction and the second image subjected to the correction.

63. The image reading method according to claim 62, wherein in the second mode, an image of one of a foreign matter and a flaw is corrected.

64. The image reading method according to claim 62, wherein said first image is displayed first and then said second image is displayed in case the second mode is selected.

65. The image reading method according to claim 62 wherein the first image is displayed immediately after extracting said first image, and said second image is displayed immediately after the image is corrected.

66. The image reading method according to claim 62, wherein said first image and said second image are displayed simultaneously.

67. The image reading method according to claim 62, wherein said first image and said second image are displayed so that the images can be switched therebetween.

68. The image reading method according to claim 62, wherein said first image and said second image are divided and stored.

69. The image reading method according to claim 68, wherein the divided and stored image data are synthesized and said first image and said second image are displayed.

70. An image reading apparatus having a first mode for reading an image of an object illuminated with light of a first wavelength range and a second mode for reading each of images of the object illuminated respectively with the light of the first wavelength range and light of a second wavelength range different from the first wavelength range, comprising:
a concealment unit which in case of that the second mode is selected, conceals a second image which is read when the object is illuminated with the light of the first wavelength range, based on a third image which is read when the object is illuminated with the light of the second wavelength range; and
a display unit which displays a first image which is read when the object is illuminated with the light of the first wavelength range, in case of that the first mode is selected, and displays the second image prior to concealment and the second image subjected to the concealment, in case of that the second mode is selected.

71. The image reading apparatus according to claim 70, wherein in the second mode, an image of one of a foreign matter and a flaw is concealed.

72. The image reading apparatus according to claim 70, wherein said display unit displays said first image and then displays said second image in case that the second mode is selected.

73. The image reading apparatus according to claim 70, wherein said display unit displays the first image immediately after extracting said first image, and displays said second image immediately after the image is corrected by said concealment unit.

74. The image reading apparatus according to claim 70, wherein said display unit simultaneously displays said first image and said second image.

75. The image reading apparatus according to claim 70, wherein said display unit displays said first image and said second image so that the image so that the images can be switched therebetween.

76. The image reading apparatus according to claim 70, further comprising a storing unit which divides and stores said first image and said second image.

77. The image reading apparatus according to claim 70, wherein said display unit synthesizes the divided and stored image data and displays said first image and said second image.

78. A storage medium which stores a program for controlling a signal processing apparatus, said program comprising:
reading an image of an object illuminated with light of a first wavelength range;
reading an image of the object illuminated with light of a second wavelength range different from the first wavelength range; and
changing a reading resolution, between when the object is illuminated with the light of the first wavelength range and when the object is illuminated with the light of the second wavelength range.

79. The storage medium according to claim 78, wherein the second wavelength range includes more non-visible light component than the first wavelength range, and wherein the reading resolution when the object is illuminated with the light of the second wavelength range, is set to be less than then when the object is illuminated with the light of the first wavelength range.

80. The storage medium according to claim 78, wherein the second wavelength range includes more non-visible light component that the first wavelength range, and wherein the reading resolution when the object is illuminated with the light of the second wavelength range is variably set according to the reading resolution when the object is illuminated with the light of the first wavelength range.

81. The storage medium according to claim 78, wherein the reading resolution is change according to a change of the amount of information to be read.

82. The storage medium according to claim 78, wherein the second wavelength range includes more non-visible light component than the first wavelength range, and wherein an area to be corrected is determined based on the image of the object illuminated with the light of the second wavelength range.

83. The storage medium according to claim 78, wherein each of the images of the object illuminated with the first and second wavelength ranges respectively is stored, an area to be corrected is determined based on the image of the object illuminated with the light of the second wavelength range, and the image of the object illuminated with the light of the first wavelength range is corrected according to the determination of the area to be corrected.

84. A signal processing method of processing an image signal which is obtained by reading with a reading unit an image of an object illuminated with each of light of a first wavelength range and light of a second wavelength range, comprising:

correcting difference between the images of the object, caused by a difference in an image formation position resulted in from illuminating each of the light of the first wavelength range and the light of the second wavelength range through an optical system, by subjecting the image signal to a predetermined signal processing.

85. The signal processing method according to claim 84, wherein the difference between the images of the object is a difference in size of the image.

86. A signal processing apparatus for processing an image signal which is obtained by reading with a reading unit an image of an object illuminated with each of light of a first wavelength range and light of a second wavelength range, comprising:

a correction unit which corrects difference between the images of the object, caused by a difference in an image formation position resulted in from passing each of the light of the first wavelength range and the light of the second wavelength range through an optical system, by subjecting the image signal to a predetermined signal processing.

87. The signal processing apparatus according to claim 86, wherein the difference between the images of the object is a difference in size of the image.

* * * * *

UNITED STATES PATENT AND TRADEMARK OFFICE
CERTIFICATE OF CORRECTION

PATENT NO. : 6,765,206 B2  
APPLICATION NO. : 09/569256  
DATED : July 20, 2004  
INVENTOR(S) : Sugiyama et al.

Page 1 of 1

It is certified that error appears in the above-identified patent and that said Letters Patent is hereby corrected as shown below:

On the Title Page

Under item "(56) References Cited",

--U.S. PATENT DOCUMENTS, 5,266,805 A 11/93    Edgar……………. 250/330

FOREIGN PATENT DOCUMENTS,

JP H07-97402 B 10/1995;

JP H06-78992 B 10/1994; and

JP 2,559,970    9/1996-- should be added.

Signed and Sealed this

Twenty-sixth Day of December, 2006

JON W. DUDAS  
*Director of the United States Patent and Trademark Office*